(12) United States Patent
Dees

(10) Patent No.: US 12,445,833 B2
(45) Date of Patent: Oct. 14, 2025

(54) PRIVACY OF RELAY SELECTION IN CELLULAR SLICED NETWORKS

(71) Applicant: KONINKLIJKE PHILIPS N.V., Eindhoven (NL)

(72) Inventor: Walter Dees, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 429 days.

(21) Appl. No.: 18/018,590

(22) PCT Filed: Aug. 23, 2021

(86) PCT No.: PCT/EP2021/073230
§ 371 (c)(1),
(2) Date: Jan. 30, 2023

(87) PCT Pub. No.: WO2022/038292
PCT Pub. Date: Feb. 24, 2022

(65) Prior Publication Data
US 2023/0319549 A1    Oct. 5, 2023

(30) Foreign Application Priority Data

Aug. 21, 2020  (EP) .................................... 20192144
Aug. 24, 2020  (EP) .................................... 20192352
(Continued)

(51) Int. Cl.
*H04W 12/03*   (2021.01)
*H04W 8/00*    (2009.01)
(Continued)

(52) U.S. Cl.
CPC ........... *H04W 12/03* (2021.01); *H04W 8/005* (2013.01); *H04W 12/06* (2013.01); *H04W 76/10* (2018.02)

(58) Field of Classification Search
CPC . H04W 76/14; H04W 8/005; H04W 12/0431; H04W 12/06; H04W 12/062;
(Continued)

(56) References Cited

U.S. PATENT DOCUMENTS 9,445,352 B2   9/2016  Wu et al.
9,565,573 B2   2/2017  Mukherjee et al.
(Continued)

FOREIGN PATENT DOCUMENTS

WO   WO-2017002855 A1 *  1/2017  ............ H04W 92/18
WO      2018083381 A1    5/2018
(Continued)

OTHER PUBLICATIONS

International Search Report and Written Opinion from PCT/EP2021/073230 mailed Nov. 22, 2021.
(Continued)

*Primary Examiner* — Matthew C Sams

(57) ABSTRACT

A cellular communication system supports a Network Relay Function (140) for managing the indirect connections. A mobile device (110) may send a request message to a relay device (120), the request message including a relay service code (associated with a set of privacy sensitive PDU session parameters). The relay device receives the request message and sends a transfer request message to the cellular communication system indicating a request to transfer data via an indirect connection and including the requested relay service code. The Network Relay Function receives the transfer request message, determines a different relay service code to be used instead of the requested relay service code; and sends a transfer response message including the different relay service code in an encrypted manner that allows it to be decrypted by the mobile device, but not the relay device; and forwarding by the relay device the
(Continued)

encrypted different relay service code to the mobile device in a response to the request message.

33 Claims, 8 Drawing Sheets

(30) Foreign Application Priority Data

| | | | |
|---|---|---|---|
| Jan. 19, 2021 | (EP) | ...................................... | 21152328 |
| Feb. 19, 2021 | (EP) | ...................................... | 21158292 |
| Aug. 9, 2021 | (EP) | ...................................... | 21190309 |
| Aug. 18, 2021 | (EP) | ...................................... | 21191932 |

(51) Int. Cl.
*H04W 12/06* (2021.01)
*H04W 76/10* (2018.01)

(58) Field of Classification Search
CPC . H04W 12/069; H04W 12/084; H04W 12/71; H04W 4/80; H04W 40/22; H04W 48/04; H04W 76/10; H04W 8/00; H04W 8/24; H04W 84/047; H04W 88/04; H04W 92/18; H04L 61/50
See application file for complete search history.

(56) References Cited

U.S. PATENT DOCUMENTS

| | | | |
|---|---|---|---|
| 9,826,460 B2 | 11/2017 | Patil et al. | |
| 10,177,834 B2 | 1/2019 | Basu Mallick et al. | |
| 10,212,651 B2 | 2/2019 | Gulati et al. | |
| 10,313,867 B2* | 6/2019 | Kuge | H04W 12/06 |
| 2015/0341794 A1* | 11/2015 | Vanderveen | H04W 12/10 |
| | | | 713/181 |
| 2016/0212721 A1 | 7/2016 | Sheng et al. | |
| 2016/0227518 A1 | 8/2016 | Li et al. | |
| 2016/0285539 A1 | 9/2016 | Sadiq et al. | |
| 2018/0035448 A1 | 2/2018 | Gupta et al. | |
| 2018/0092017 A1 | 3/2018 | Freda et al. | |
| 2018/0192280 A1 | 7/2018 | Kuge | |
| 2019/0335332 A1* | 10/2019 | Ying | H04W 40/22 |
| 2022/0330361 A1* | 10/2022 | Ding | H04W 48/10 |

FOREIGN PATENT DOCUMENTS

| | | | |
|---|---|---|---|
| WO | 2018129543 A1 | 7/2018 | |
| WO | 2021001086 A1 | 1/2021 | |

OTHER PUBLICATIONS

Philips International B V: UE-to-Network Relay discovery and handling of POU session parameters with Remote UE based relay selection11,3GPP Draft; S2-2004202, 3rd Generation Partnership Project. (3GPP), Mobile Competence. Centre • 650, Route Des L. Ucio Les • F-06921 Sophia-Antipolis Cedex • France.

Philips International B V: "LIE-to-Network Relay discovery and handling of POU session parameters with CN based relay selection", 3GPP Draft; S2-2004201, 3rd Generation Partnership Project (3GPP), Mobile Competence Centre; 650, Route Des Lucioles ; F-06921 Sophia-Antipolis Cedex ; FRANCE vol. SA WG2, No. Elbonia; Jun. 1, 2020-Jun. 12, May 22, 2020 (May 22, 2020).

Huawei et al: "Authorization checking on per MCPTT group basis",3GPP Draft; S6-150732 WAS S6-150693 Authorization Checking on Per MCPTT Group, 3rd Generation Partnership Project (3GPP), Mobile Competence Centre; 650, Route Des Lucioles ; F-06921Sophia-Antipolis vol. SA WG6, No. Seoul, Korea; Jul. 6, 2015-Jul. 11, 2015 Jul. 10, 2015 (Jul. 10, 2015).

ZTE et al: "Security for Relay Service Code",3GPP Draft; S3-152275-CR0090—Security for Relay Service Code, 3rd Generation Partnership Project (3GPP), Mobile Competence Centre; 650, Route Des Lucioles ; F-06921 Sophia-Antipolis Cedex; France vol. SA WG3, No. Anaheim, US; Nov. 9, 2015-Nov. 13, 2015 Nov. 9, 2015 (Nov. 9, 2015).

Intel: "Security for Remote UE to UE-Network Relay Proximity-based Services (ProSe) Direct Communication for Public Safety Use",3GPP Draft; S3-151809, 3rd Generation Partnership Project (3GPP), Mobile Competence Centre; 650, Route Des Lucioles ; F-06921 Sophia-Antipolis Cedex; France vol. SA WG3, No. Tallinn; Apr. 20, 2015-Apr. 30, 2015Aug. 19, 2015 (Aug. 19, 2015).

Philips International B V: "Solution to mitigate privacy issues of relay service codes and POU parameters for L3 UE-to-NW relays",3GPP Draft; S3-210543, 3rd Generation Partnership Project (3GPP), Mobile Competence Centre; 650, Route Des Lucioles ; F-06921 Sophia-Antipolis Cedex; France vol. SA WG3, No. e-meeting; Jan. 18, 2021-Jan. 29, 2021 Jan. 11, 2021 (Jan. 11, 2021).

Philips International B V: "Update to solution #32",3GPP Draft; S3-212147, 3rd Generation Partnership Project (3GPP), Mobile Competence Centre; 650, Route Des Lucioles ; F-06921 Sophia-Antipolis Cedex ; France vol. SA WG3, No. e-meeting; May 17, 2021-May 28, 2021 May 21, 2021 (May 21, 2021).

Samsung , Solution for key management in 5G ProSerelay communication[online] , 3GPP TSG SA WG3 #100e S3-201961 , Internet<URL:https://www.3gpp.org/ftp/tsg_sa/WG3_Security/TSGS3_100e/Docs/S3-201961.zip>, 2020年08月07日, [検索日 Apr. 15, 2025].

* cited by examiner

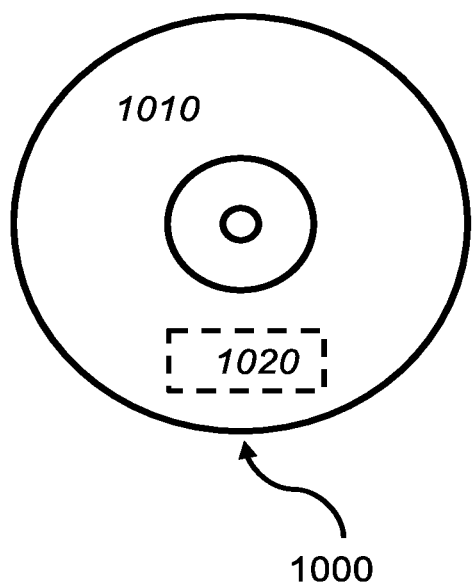 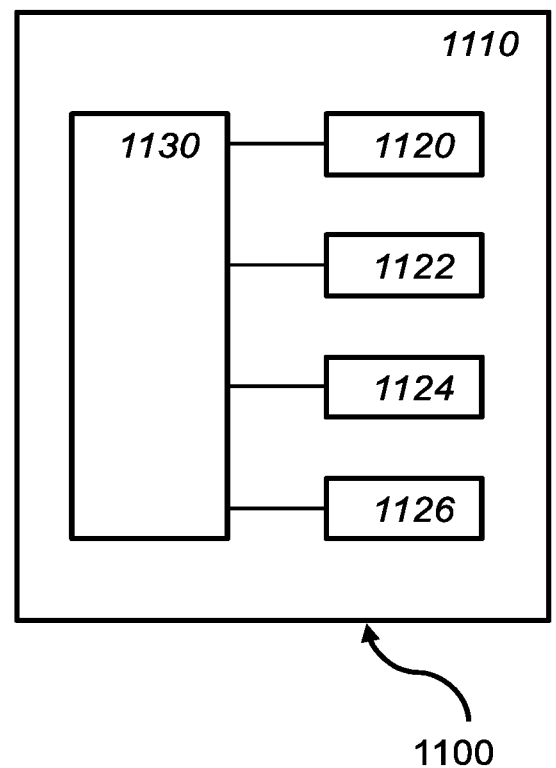
Fig. 6a  Fig. 6b

PRIVACY OF RELAY SELECTION IN CELLULAR SLICED NETWORKS

CROSS REFERENCE TO RELATED APPLICATIONS

This application is a U.S. national phase application of International Application No. PCT/EP2021/073230 filed on Aug. 23, 2021, which claims the benefit of EP Application Serial No. 20192144.2 filed on Aug. 21, 2020, EP Application Serial No. 20192352.1 filed on Aug. 24, 2020, EP Application Serial No. 21152328.7 filed on Jan. 19, 2021, EP Application Serial No. 21158292.9 filed on Feb. 19, 2021, EP Application Serial No. 21190309.1 filed on Aug. 9, 2021 and EP Application Serial No. 21191932.9 filed Aug. 18, 2021 and are incorporated herein by reference.

FIELD OF THE INVENTION

The present invention relates to the field of well-known cellular wireless communication systems (CCS), e.g. LTE, 4G or 5G networks. The cellular wireless communication system comprises a core network (CN) and a Radio Access Network (RAN) comprising multiple cellular base stations (BS). The cellular communication system may provide a cellular network that supports network slicing and indirect connections, while mobile devices may connect to the core network via the base stations. Access to the network is managed by so-called providers or mobile network operators (MNO). A network slice provides a logical network using a shared physical infrastructure of the cellular communication system. An indirect connection provides data transfer between a mobile device and the cellular communication system via at least one relay device.

BACKGROUND OF THE INVENTION

Mobile devices communicating using cellular wireless communication standards are being further developed continuously, for example according to 3GPP 5G specifications. The wireless devices can be of different types, e.g. mobile phones, vehicles for vehicle-to-vehicle (V2V), or more general vehicle-to-everything communication (V2X), internet of things (IoT) devices, medical (emergency) diagnosis and treatment devices, virtual reality (VR) headsets, etc. Because the characteristics of mobile devices like the above differ vastly, e.g. in terms of low-power operation, tolerated maximum latency, required bandwidth and mobility, the 5G system and radio access network specifications define the concept of network slicing (see [23.501], [38.300], [Elayoubi]).

A network slice can be viewed as an isolated 'virtual 5G network' that operates on a common shared hardware/software platform, where platform components may be shared among multiple slices, but each slice still operates independently. Each slice can offer a performance, service level, policies and features that is optimally tailored to the specific use case or application domain. A slice can also be operated as a service by a different network operator than the one owning the hardware/software platform. Slicing can be done in a Core Network (CN), or in a Radio Access Network (RAN), or both.

A mobile device, commonly name user equipment (UE), may be part of multiple slices at the same time. The UE may establish multiple Protocol Data Unit (PDU) sessions to the CN, each session operating in a specific slice. Further explanation about network slicing can be found in [PavelShulgin]. The UE also covers the case the UE is a stationary device. The user equipment may be any device used directly the end user. This includes non-stationary and stationary devices. Another characteristic of a UE is that it typically uses the 3GPP Uu interface to communicate with the base station, and that it typically has its own mobile subscription, its own SIM card and is identifiable through IMSI.

An example of requesting a session operating in a slice is discussed in [EventHelix]. FIG. 1 shows an excerpt from a diagram showing User Equipment (UE) requesting a slice. The UE sends a Requested Network Slice Selection Assistance Information (NSSAI) in the 21:RRCSetupComplete message and the Base Station (gNB) forwards this information in the 24:NGAP Initial UE Message that it sends. The term 5GC is used to denote the 5G Core Network.

In the 3GPP specifications for 4G the Proximity Services (ProSe) functions (see [23.303] and [24.334]) are defined to enable connectivity for cellular User Equipment (UE) that is temporarily not in coverage of a cellular network base station (eNB). This particular function is called ProSe UE-to-network relay, or relay UE for short. The relay UE is a UE that helps another out-of-coverage (OoC) UE to communicate to the eNB by relaying application and network traffic in two directions between the OoC UE and the eNB. The local communication between the relay UE and the OoC UE is called device-to-device (D2D) communication or Sidelink (also known as PC5) communication (see [23.303] and [24.334]). Once the relaying relation is established, the OoC-UE is back in coverage via the relay UE and acts in the role of 'remote UE'. This situation means the remote UE has an indirect connection to the 4G Core Network as opposed to a direct network connection which is the normal case.

In this document the terms 'eNB' (4G term) and 'gNB' (5G term) mean cellular base station. The eNB/gNB is part of the Radio Access Network RAN, which interfaces to functions in the Core Network CN. 'OoC' is Out-of-Coverage. 'indirect connection' is the same as 'indirect network connection' as defined in [22.261]. Slice-specific 5G terminology NSSAI, S-NSSAI, NSSF, etc. is defined in [23.501]. 'D2D' is Device-to-Device communication, and 'PC5' is the interface for sidelink communication as defined by ProSe [23.303], eProSe [36.746] or V2X [23.287].

Various legacy solutions involving relaying are known in the art, related to 3GPP work (each number below is a separate topic):

US20180092017A1, U.S. Pat. No. 9,826,460, U.S. Ser. No. 10/212,651B2, US20160212721A1 describe selecting one relay out of multiple candidate relays based on signal strength, or advertised group ID;

U.S. Ser. No. 10/177,834B2 describes eNB broadcasts bandwidth requirements for a relay into its cell and relay-capable devices automatically use this to determine to become a relay if they meet the requirement.

US20160227518A1 describes eNB determines that a UE is OoC and that it needs to send to that UE some information (via a Relay) to help it to get connected again US20160227518A1 describes a relay-capable UE deciding to become relay only if it has sufficient connectivity capacity, or battery power, or a proper service type/context;

U.S. Pat. No. 9,445,352B2 describes an OoC UE needing a relay so it sends a D2D message to its neighbors to request someone to become a Relay, upon which one or more UEs become a relay.

WO2018083381A1 describes an OoC UE asking a peer UE over Sidelink/D2D some configuration information that it needs to get back connected to the network, via a relay.

US20180035448A1 describes an eNB sending Sidelink scheduling grant information with specific scheduling for OoC UEs; this information is received by in-coverage UEs and by these UEs retransmitted to the OoC UEs.

U.S. Pat. No. 9,565,573B2 describes that in-coverage UE sends a D2D signal, to which an OoC UE can respond with an indication that it needs coverage. The in-coverage UE then sends this received indication to the network. Optionally the network can then use this indication to instruct the in-coverage UE to become a relay.

It is possible to define a mechanism for selecting a relay UE that is best suited to serve a certain network slice that a remote UE wishes to use for connecting (via the relay UE) to a cellular core network.

This invention relates to the privacy aspects of relay discovery and selection of relay UEs in cellular sliced networks, in particular for out-of-coverage UEs. For discovery of relay UEs, the ProSe framework makes use of so-called Relay Service Codes (see [23.303] and [24.334]). A Relay Service Code can be used by a remote UE during discovery of relay UEs. For example, using a so-called "Model A" discovery mechanism, a relay UE may broadcast information about supporting a certain set of Relay Service Codes that it supports. Each Relay Service Code may correspond to a set of PDU session attributes, and a remote UE can use the discovered relay UEs and the Relay Service Codes that they broadcast to find a relay UE that matches one or more of the Relay Service Codes known by the Remote UE to match a set of PDU session parameters, and hence use it to select amongst possibly multiple relay UEs the relay UE that is most suitable to be used as relay for a PDU session(s) that a remote UE wishes to set up, Similarly, using a so-called "Model B" discovery mechanism, a remote UE may request a certain set of Relay Service Codes as part of a discovery request, that a relay UE will use to match and respond to if it supports one or more of the requested Relay Service Codes. It is important to note that open discovery and connection request messages over PC5 are not encrypted, and hence any other device in vicinity can monitor and overhear these messages.

In case UE-based relaying is done at layer-3 (i.e. IP layer), the relay UE needs, at some point in time before the indirect connection between the remote UE and a cellular network via the relay UE can begin, to receive information on how to set up a PDU session on behalf of the remote UE. This leads to privacy issues, since PDU session information includes information such as a certain network slice that a remote UE want to connect to or a certain Data Network Name (DNN). This can reveal that the Remote UE is e.g. from a law enforcement officer connecting to a DNN reserved for a certain police department or to a slice dedicated to communication for the police. A relay UE is typically authorized by the network to act as a relay device, and may have to go through some vetting process. However, that does not mean that it is allowed to simply keep track of all this privacy sensitive information, even after a remote UE has disconnected, and allow the relay UE to track the remote UE by tracking the Relay Service Codes that it may use for subsequent discovery and/or connection to another relay UE, nor it allows the relay UE to be able to track other remote UEs in vicinity using the same Relay Service Code.

As a possible mitigation, Relay Service Codes could be given a very short lifetime, e.g. changing every few minutes. However, updating all potential remote UEs and relay UEs with this new Relay Service Code would cause a lot of traffic. For updating this information, each of these UEs would have to be awake and in coverage of a gNB operated by the core network. This may be quite difficult to achieve given that many UEs can be asleep or out of coverage. In particular, remote UEs are typically out of coverage, otherwise they would not need a relay to be able to reach the network. So such mechanism would be highly inefficient.

SUMMARY OF THE INVENTION

There is a need to include ProSe relaying or a similar technology for UE-based relaying into next generation cellular communication networks such as 5G. However, the use of network slices as introduced by 5G introduces new requirements and new challenges if UE based relaying needs to be considered, such as the following.

The UE needs to be able to connect to one or more of its required and/or preferred 5G network slice instances via a relay UE, and hence it needs to know which relay UEs in vicinity would be capable or would not be capable to do so.

There may be multiple candidate relay UEs in the radio range of the UE, whereby relay UEs may move around and go out of range, and new relay UEs may appear in range.

The network slice instances required and/or preferred by UE may be different from the slice(s) which the best relay UE candidate is connected to at that moment.

The UE may be OoC at the moment the selection needs to be made.

The relay UE may be a resource constrained device, and hence may not be able to provide the QoS as expected/required for a certain network slice.

The relay UE may have one or more PDU connections of its own (i.e. since it is typically a UE owned by someone else wishing to access e.g. the internet) and may have very limited resources left for supporting indirect network communication for another UE.

A network slice required or preferred by UE may use a different frequency band than currently used by the relay UE candidates, The UE may participate in two or more network slices which each have their unique requirements in terms of what constitutes the optimal Relay and corresponding network path for the indirect connection, and hence there may be a need to select two (or even more) relay UEs as an optimal solution to perform the relaying.

The candidate relay UEs are typically a-priori unknown and untrusted to the UE—posing a mutual security risk since there is no initial trust between parties and using unsecure procedure to connect to the relay UE also imposes security risks. For example, the UEs that are to start a Relay/Remote relation may have never encountered before. This case may commonly occur if e.g. 1) mobile cellular IoT devices move around, or 2) mobile or stationary cellular IoT devices are deployed and activated for the first time in a new environment, A candidate relay UE may not be authorized and may not have the necessary credentials to connect to the network slice and/or to send/receive data to/from the network slice and/or to participate in a relay connection towards the network slice, in particular for private network slices that are only allowed to be used by UEs belonging to a pre-defined group.

An additional issue are potential privacy risks. For example, a candidate relay UE (and also other remote UEs) may gain access or needs to be provided information about network slices and e.g. a DNN that a Remote UE (intends to) connect to. A DNN identifier (e.g. similar to a URI that may contain e.g. a name of a company or organization or a certain facility) or slice identifier may reveal information that is privacy sensitive or could potentially be linked to certain companies/organization or other entities since these are typically quite static. This leads to privacy issues, and may e.g. enable a relay UE to determine what kind of information the Remote UE is interested in, which DNN it will send its data to and receive its data from, and also enable a relay UE to potentially track Remote UE even after they have disconnected or have not connected at all yet to the relay UE. In particular, in case of layer-3 relays (i.e. relaying at IP layer, instead of MAC layer), the relay UE needs to set up a PDU session on behalf of the remote UE, and hence at some point in time needs to be given information about that PDU session.

In general, exposure of information related to slices and DNNs that a UE uses or wishes to use for its relay operation (i.e. for the purpose of relay selection and/or setting up a relayed connection to the network), is privacy sensitive as it may reveal that a UE belongs a special subscription group, e.g. police/law enforcement/customs or is linked e.g. to a healthcare facility.

One of the potential issues is that Remote UEs and Relay UEs may be provisioned with a set of PDU session parameters associated with each Relay Service Code it supports, e.g. by providing one or more S-NSSAI value(s) or DNN value (s)associated with a particular Relay Service Code. Relay Service Codes are used during discovery of Relay UEs. Given that Remote UEs should be able to operate out-of-coverage, the Relay Service Codes are expected to be quite static and have a fairly long lifetime (i.e. probably more in terms of hours rather than in seconds). Pre-configuring a large set of Relay UE devices or Remote UE devices with persistent and/or relatively static information that can be associated to slicing and/or DNN information (such as relay service codes) may enable these devices to perform various privacy attacks including tracing and tracking of identities of Remote UEs by linking them to the relatively static or persistent information. Especially since Remote UEs and Relay UEs are end-user devices and cannot be sufficiently trusted (unlike e.g. core network function or base stations)

Some of these considerations also apply for accessing Non-Public Networks (NPNs), see [23.501]. This concept has some similarities with network slices that has been introduced in 5G. NPNs are dedicated networks for a limited set of users and can operate either as a separate mobile core network, or on top of a Public Land Mobile Network (PLMN) of a mobile network operator whereby the NPN typically is deployed as a slice and/or Closed Access Group within the PLMN. Besides the fact an NPN could be implemented on top of an existing hardware/software infrastructure using a network slice, an NPN could also have one or more slices of its own, in particular if the NPN is operated as a separate standalone network. In a manner similar to that of slices, also relaying of traffic targeted to certain NPNs may be restricted to only remote UEs and relay UEs that are authorized to have access to the NPN. Also, NPNs may have some requirements for minimum QoS and service area restrictions and other aspects that are similar to network slices, and also other dynamic aspects need to be taken into account to assess whether the relay UE is suitable to act as a relay for a data connection between the remote UE and the NPN. In the remainder of the document, the term network slice is also used to denote a Non-Public Network.

It is an object of the invention to provide, in a cellular communication system an efficient mechanism to avoid privacy sensitive PDU session information and relatively static relay service codes to be used by a relay UE (and other remote UEs) for tracking of remote UEs.

For this purpose, devices and methods are provided as defined in the appended claims. According to an aspect of the invention a cellular communication system, a mobile device, a network relay entity and a relay device are provided as defined in the appended claims. According to a further aspect of the invention there is provided a computer program product downloadable from a network and/or stored on a computer-readable medium and/or microprocessor-executable medium, the product comprising program code instructions for implementing the above method when executed on a computer.

The cellular communication system (CCS) comprises a radio access network (RAN) comprising multiple cellular base stations (BS) and a core network (CN). The cellular communication system provides a cellular network that supports network slicing and indirect connections, each network slice providing a logical network using a shared physical infrastructure of the cellular communication system, each indirect connection providing data transfer between a mobile device and the cellular communication system via at least one relay device being a mobile device arranged for communication with the radio access network and capable of supporting the indirect connection. The cellular communication system comprising at least one network relay entity arranged to provide a Network Relay Function (NRF) for managing the indirect connections.

The mobile device may comprise a transceiver arranged for wireless communication in the cellular network, and a connection processor arranged for managing connections to the cellular network, the connection processor providing a relay function for managing at least one indirect connection. The relay function may be arranged:

to send a request message to at least one relay device (UEx), the request message including a Relay Service Code (RSC1) and also includes an identifier of the at least one relay device (UEx), and further containing an identifier of the mobile device;

to receive a response message from the at least one relay device (UEx), the response message including an encrypted Relay Service Code (RSC2), the encrypted Relay Service Code (RSC2) encrypted by a Network Relay Function (NRF) in the cellular network using a key that allows it to be decrypted by the mobile device but not the relay device;

to decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1;

In an embodiment, the mobile device may comprise a non-volatile storage unit arranged for storing a set of Relay Service Codes that are supported by the mobile device that may each be associated with a set of PDU session attributes.

The relay device may comprise a communication unit arranged for communication in the cellular network, and a relay processor arranged for managing the communication in the cellular network and for managing an indirect connection between the mobile device and the cellular network. The relay processor may be arranged:
  to store a set of spare Relay Service Codes;
  to receive the request message from the mobile device;
  after receiving request message, to send a transfer request message to the cellular communication system in dependence of the request message, the transfer request message including the Relay Service Code RSC1 and the identifier of the mobile device received from the mobile device in the request message.
  to receive a transfer response message from the cellular communication system, the transfer response message containing an encrypted Relay Service Code (RSC2);
  after receiving the transfer response message, to send a response message to the mobile device in dependence of the transfer response message and containing the encrypted Relay Service Code (RSC2).

The relay device may comprise a non-volatile storage unit arranged for storing a set of Relay Service Codes that are supported by the mobile device, including a set of spare Relay Service Codes.

The Network Relay Function may be arranged
  to receive at least one transfer request message from the relay device, the transfer request message including a Relay Service Code (RSC1) and an identifier of the mobile device;
  to determine a different Relay Service Code (RSC2') to be used instead of the Relay Service Code (RSC1) received in the transfer request message, whereby the different Relay Service Code (RSC2') is selected from the one or more spare Relay Service Codes available in the relay device or a fresh Relay Service Code.
  to encrypt the different Relay Service Code (RSC2') using a key that allows it to be decrypted by the mobile device but not the relay device, resulting in an encrypted Relay Service Code (RSC2).
  to send a transfer response message including the encrypted Relay Service Code (RSC2) to the relay device.

Advantageously, an eavesdropper (including relay devices and other remote UE) cannot track the mobile device using Relay Service Code RSC1 after it disconnects, even if the discovery and connection setup messages itself are unencrypted and not authenticated and the Relay Service Codes are sent in the clear. It also does this in an efficient manner, as only the Relay Service Code that has been used by a remote UE (i.e. mobile device UE0) needs to be updated, and not all Relay Service Codes in all other remote UE and/or relay UEs. And it also works if Remote UEs are out of coverage of the network's base stations.

Also, advantageously, the procedure may be combined with a procedure to verify the authorization of the remote UE and relay UE by the network for setting up a relay connection for the particular relay service code and/or for setting up the PDU session with the PDU session parameters associated with the relay service code, and/or may be combined with the procedure to request the security keys or privacy sensitive PDU session parameters (e.g. slice identifier/NSSAI, DNN) for setting up such relay connection from the network, and in this way enable faster and more secure connection setup.

In addition, information about slices, DNN and non-public networks, and other PDU session related parameters may be considered privacy sensitive. It could lead to undesired tracking of mobile devices and expose deployment information of the operator (e.g. which slices and NPNs are supported by the core network). In 5G, in order to prevent privacy leakage of slice information, the slice information may only be sent to the UE later in the process during CN attachment/authentication after some initial security context is in place, hence no slice information (or only encrypted or temporary slice information) is sent early in the process. Moreover, a relay UE may not be able to access, not be authorized to access, or not be able to support the characteristics (e.g. a required QoS or frequency band) of the slice that the remote UE wants to use. Hence, by using the NRF to provide the PDU session parameters only to the relay UE that is selected by the remote UE (and possibly only after verifying if the relay UE is authorized for setting up the respective relay connection and/or setting up the PDU session with the respective PDU session parameters to the network on behalf of the remote UE), no unnecessary information about PDU session parameters needs to be stored in the Relay UE beforehand or in other Relay UEs that have not been selected, which are typically untrusted end-user devices.

There is provided a cellular communication system comprising a radio access network comprising multiple cellular base stations and a core network, the cellular communication system providing a cellular network that supports indirect connections, each indirect connection providing data transfer between a mobile device and the cellular communication system via at least one relay device being a mobile device arranged for communication with the radio access network and capable of supporting the indirect connection, the cellular communication system comprising at least one network relay entity arranged to provide a Network Relay Function (NRF) for managing the indirect connections, the mobile device comprising:
  a connection processor arranged for managing connections to the cellular network, the connection processor providing a relay function for managing at least one indirect connection, the relay function being arranged to at least
  send, as part of a setup procedure, a request message to at least one relay device (UEx), the request message including a Relay Service Code (RSC1) and an encrypted identifier of the at least one relay device (UEx), and further containing an encrypted identifier of the mobile device;
  receive a response message from the at least one relay device (UEx), the response message including an encrypted Relay Service Code (RSC2);
  decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1; the relay device comprising:
  a communication unit arranged for communication in the cellular network (130), and,
  a relay processor arranged for managing the communication in the cellular network and for managing an indirect connection between the mobile device and the cellular network, the relay processor being arranged
  to receive the request message from the mobile device;
  after receiving request message, to send a transfer request message to the cellular communication system in dependence of the request message, the transfer request message including the Relay Service Code RSC1 and at least one of the encrypted identifiers received from the mobile device in request message;

to receive a transfer response message from the cellular communication system, the transfer response message containing an encrypted Relay Service Code (RSC2);

after receiving the transfer response message, to send a response message to the mobile device in dependence of the transfer response message and containing the encrypted Relay Service Code (RSC2);

the Network Relay Function being arranged to receive at least one transfer request message from the relay device, the transfer request message including a Relay Service Code (RSC1) and at least one of the encrypted identifiers of the mobile device and the encrypted identifier of the relay device;

to determine a different Relay Service Code (RSC2') to be used instead of the Relay Service Code (RSC1) received in the transfer request message; —to encrypt the different Relay Service Code (RSC2') using a key that allows it to be decrypted by the mobile device but not the relay device, resulting in an encrypted Relay Service Code (RSC2).

to send a transfer response message including the encrypted Relay Service Code (RSC2) to the relay device.

According to an aspect, the Network Relay Function is arranged to encrypt the identifier of the mobile device and/or the identifier of the relay device using a key that allows them to be decrypted by a Network Relay Function (NRF) in the cellular network and not by the relay device.

There is, alternatively, provided a Cellular communication system (CCS) comprising a radio access network (RAN) comprising multiple cellular base stations (BS) and a core network (CN), the cellular communication system providing a cellular network that supports indirect connections, each indirect connection providing data transfer between a mobile device and the cellular communication system via at least one relay device being a mobile device arranged for communication with the radio access network and capable of supporting the indirect connection, the cellular communication system comprising at least one network relay entity (140) arranged to provide a Network Relay Function (NRF) for managing the indirect connections, the mobile device comprising:

a connection processor arranged for managing connections to the cellular network, the connection processor providing a relay function for managing at least one indirect connection, the relay function being arranged to at least send, as part of a setup procedure, a request message to at least one relay device (UEx), the request message including a Relay Service Code (RSC1) and also includes an identifier of the at least one relay device (UEx), and further containing an identifier of the mobile device and a message authentication code;

receive a response message from the at least one relay device (UEx), the response message including an encrypted Relay Service Code (RSC2);

decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1; the relay device comprising:

a communication unit arranged for communication in the cellular network, and, a relay processor arranged for managing the communication in the cellular network and for managing an indirect connection between the mobile device and the cellular network, the relay processor being arranged to receive the request message from the mobile device;

after receiving request message, to send a transfer request message to the cellular communication system in dependence of the request message, the transfer request message including the Relay Service Code RSC1, the message authentication code and the identifier of the mobile device received from the mobile device in the request message;

to receive a transfer response message from the cellular communication system, the transfer response message containing an encrypted Relay Service Code (RSC2);

after receiving the transfer response message, to send a response message to the mobile device in dependence of the transfer response message and containing the encrypted Relay Service Code (RSC2);

the Network Relay Function being arranged to receive at least one transfer request message from the relay device, the transfer request message including a Relay Service Code (RSC1) and an identifier of the mobile device and the message authentication code;

to determine a different Relay Service Code (RSC2') to be used instead of the Relay Service Code (RSC1) received in the transfer request message;

to encrypt the different Relay Service Code (RSC2') using a key that allows it to be decrypted by the mobile device but not the relay device, resulting in an encrypted Relay Service Code (RSC2).

to send a transfer response message including the encrypted Relay Service Code (RSC2) to the relay device.

In an aspect, the relay processor is arranged to store a set of spare Relay Service Codes and wherein the Network Relay Function is arranged to select the different Relay Service Code (RSC2') from the set of spare Relay Service Codes available in the relay device or a fresh Relay Service Code.

In an aspect, at least one of the Relay Service Code (RSC1), the identifier of the mobile device, and the identifier of the at least one relay device (UEx) in the request message (M) and the transfer request message are encrypted by the mobile device or are integrity protected by the message authentication code, in order to represent a protected indicator indicative that the mobile device has selected the at least one relay device (UEx).

In an aspect, the relay device includes in transfer request message the identifier of the at least one relay device received from the mobile device in the request message.

In an aspect, the key used by the mobile device to encrypt the at least one of the Relay Service Code, the identifier of the mobile and the identifier of the at least one relay device, or the key used to determine the message authentication code allows decryption by the Network Relay Function (NRF) in the cellular network and not by the relay devices (UEx).

In an aspect, the Network Relay Function (NRF) only sends a transfer response message containing an encrypted Relay Service Code RSC2 or PDU session information related to RSC1 to the at least one relay device (UEx) if the output of decrypting the received encrypted identifiers reveals an identifier of the at least one relay device or if the Message Authentication Code as forwarded by the at least one relay device and originating from the mobile device reveals that the identifiers have not been manipulated, using the information received in the transfer request message.

In an aspect, the information provided by the encrypted identifiers or message payload with respective Message Authentication Code in the transfer request message is used by the cellular communication system (CCS) to perform an additional verification whether the at least one relay device (UEx) is allowed/authorized to act as relay UE for the respective remote UE.

In an aspect, the mobile device is arranged to send a freshness parameter in the request message, the freshness parameter indicating that keys used to encrypt elements of the request message have not been updated for more than a predetermined time or indicating a time when the keys were last updated.

In an aspect, the Network Relay Function (NRF) is arranged to add a decrypted Relay Service Code to the transfer response message and the relay device is arranged to use the decrypted Relay Service Code to fetch a PDU session attribute.

In an aspect, the request message and response message include a Global Unique Temporary Identifier (GUTI) or Temporary Mobile Subscriber Identity (TMSI) or Subscription Concealed Identifier (SUCI).

In an aspect, the request message includes a Relay Service Code (RSC1) associated with a set of PDU session attributes.

In an aspect, the mobile device is arranged to include in the request message (M), a nonce and wherein the relay device is arranged to keep track of the used nonces and discard any request messages containing a previously used nonce or abort the setup procedure.

In an aspect, the mobile device is arranged to include in the request message (M), a nonce and wherein relay device is arranged to forward the nonce in the transfer request message (N) and the relay function is arranged to keep track of the used nonces and discard any transfer request messages containing a previously used nonce or abort the setup procedure.

In an aspect, the mobile device comprises a non-volatile storage unit arranged for storing a set of Relay Service Codes that are supported by the mobile device that may each be associated with a set of PDU session attributes and the mobile device being further arranged to store a set of Relay Service Codes that are supported by the mobile device that may each be associated with a set of PDU session attributes, and the relay device comprises a non-volatile storage unit arranged for storing a set of Relay Service Codes that are supported by the relay device, including the set of spare Relay Service Codes and the relay processor of the relay device being further arranged to store a set of spare Relay Service Codes, and wherein the Network Relay Function being further arranged to determine a different Relay Service Code (RSC2') to be used instead of the Relay Service Code (RSC1) received in the transfer request message, where the different Relay Service Code (RSC2') is selected from the set of spare Relay Service Codes available in the relay device.

There is provided, a mobile device arranged to be used in the cellular communication system as defined above comprising:
 a transceiver arranged for wireless communication in the cellular network (130), and being arranged to store a set of Relay Service Codes that are supported by the mobile device that may each be associated with a set of PDU session attributes, and
 a connection processor arranged for managing connections to the cellular network, the connection processor providing a relay function (116) for managing at least one indirect connection, the relay function being arranged to at least
 send a request message to at least one relay device (UEx), the request message including a Relay Service Code (RSC1) associated with a set of PDU session attributes and also includes an encrypted identifier of the at least one relay device (UEx), and further containing an encrypted identifier of the mobile device, the identifiers encrypted using a key that allows it to be decrypted by a Network Relay Function (NRF) in the cellular network;
 receive a response message from the at least one relay device (UEx), the response message including an encrypted Relay Service Code (RSC2), the encrypted Relay Service Code (RSC2) encrypted by a Network Relay Function (NRF) in the cellular network using a key that allows it to be decrypted by the mobile device but not the relay device;
 decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1.

There is alternatively provided, a mobile device (110) arranged to be used in the cellular communication system as defined above comprising:
 a transceiver arranged for wireless communication in the cellular network, and being arranged to store a set of Relay Service Codes that are supported by the mobile device that may each be associated with a set of PDU session attributes, and
 a connection processor arranged for managing connections to the cellular network, the connection processor providing a relay function for managing at least one indirect connection, the relay function being arranged to at least
 send a request message to at least one relay device (UEx), the request message including a Relay Service Code (RSC1) and also includes an identifier of the at least one relay device (UEx), and further containing an identifier of the mobile device, and a message authentication code;
 receive a response message from the at least one relay device (UEx), the response message including an encrypted Relay Service Code (RSC2), the encrypted Relay Service Code (RSC2) encrypted by a Network Relay Function (NRF) in the cellular network using a key that allows it to be decrypted by the mobile device but not the relay device;
 decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1.

In an aspect, a key is used to encrypt at least one of the Relay Service Code, the identifier of the mobile and the identifier of the at least one relay device, or a key is used to determine the message authentication code that allows decryption by the Network Relay Function (NRF) in the cellular network and not by the relay devices (UEx).

In an aspect, the mobile device selects a different layer-2 identification for the request message (M) from at least the most recently used layer-2 identifications used in a previous message sent from the mobile device to the relay device. The previous message may be part of a discovery message in a In an aspect, the mobile device is arranged to send a freshness parameter in the request message, the freshness parameter indicating that keys used to encrypt elements of the request message have not been updated for more than a predetermined time or indicating a time when the keys were last updated.

In an aspect, the mobile device is arranged to include a Global Unique Temporary Identifier (GUTI) or Temporary Mobile Subscriber Identity (TMSI) or Subscription Concealed Identifier (SUCI) in the request message.

There is provided, a network relay entity providing a Network Relay Function (NRF) for use in the cellular communication system as defined above, the network relay entity being arranged:
- to receive at least one transfer request message from a relay device, the transfer request message including a Relay Service Code (RSC1) and an encrypted identifier of a mobile device that has sent the Relay Service Code (RSC1) to the relay device;
- to determine a different Relay Service Code (RSC2') to be used instead of the Relay Service Code (RSC1) received in the transfer request message;
- to encrypt the different Relay Service Code (RSC2') using a key that allows it to be decrypted by the mobile device but not the relay device, resulting in an encrypted Relay Service Code (RSC2).
- to send a transfer response message including the encrypted Relay Service Code (RSC2) to the relay device.

In an aspect, the different Relay Service Code (RSC2') to be used instead of the Relay Service Code (RSC1) is selected from a set of spare Relay Service Codes available in the relay device.

There is alternatively provided, a network relay entity (140) providing a Network Relay Function (NRF) for use in the cellular communication system as defined above, the network relay entity being arranged:
- to receive at least one transfer request message from a relay device, the transfer request message including a Relay Service Code (RSC1) and an identifier of a mobile device that has sent the Relay Service Code (RSC1) to the relay device and a message authentication code;
- check the message authentication code to verify that the Relay Service Code and the identifier of the mobile device have not been manipulated
- to determine a different Relay Service Code (RSC2') to be used instead of the Relay Service Code (RSC1) received in the transfer request message, whereby the different Relay Service Code (RSC2') is selected from a set of spare Relay Service Codes available in the relay device or a fresh Relay Service Code;
- to encrypt the different Relay Service Code (RSC2') using a key that allows it to be decrypted by the mobile device but not the relay device, resulting in an encrypted Relay Service Code (RSC2).
- to send a transfer response message including the encrypted Relay Service Code (RSC2) to the relay device.

In an aspect, the Network Relay Function is arranged to add a decrypted Relay Service Code to the transfer response message and the relay device is arranged to use the decrypted Relay Service Code to fetch a PDU session attribute.

In an aspect, the Network Relay Function is arranged to include a new encrypted Global Unique Temporary Identifier (GUTI) or Temporary Mobile Subscriber Identity (TMSI) or Subscription Concealed Identifier (SUCI) in transfer response message (N').

There is provided a relay device arranged for communication in the cellular network as defined above and comprising:
- a relay processor arranged for managing the communication in the cellular network and for managing an indirect connection between the mobile device and the cellular network, the relay processor being arranged
- to receive, as part of a setup procedure, the request message from the mobile device;
- after receiving request message, to send a transfer request message to the cellular communication system in dependence of the request message, the transfer request message including the Relay Service Code RSC1 and at least one of the encrypted identifiers received from the mobile device in message M;
- to receive a transfer response message from the cellular communication system, the transfer response message containing an encrypted Relay Service Code (RSC2);
- after receiving the transfer response message, to send a response message to the mobile device in dependence of the transfer response message and containing the encrypted Relay Service Code (RSC2).

There is alternatively provided a relay device arranged for communication in the cellular network as defined above and comprising:
- a relay processor arranged for managing the communication in the cellular network and for managing an indirect connection between the mobile device and the cellular network, the relay processor being arranged
- to store a set of spare Relay Service Codes;
- to receive, as part of a setup procedure, the request message from the mobile device;
- after receiving request message, to send a transfer request message to the cellular communication system in dependence of the request message, the transfer request message including the Relay Service Code RSC1, the message authentication code and the identifier of the mobile device received from the mobile device in the request message;
- to receive a transfer response message from the cellular communication system, the transfer response message containing an encrypted Relay Service Code (RSC2);
- after receiving the transfer response message, to send a response message to the mobile device in dependence of the transfer response message and containing the encrypted Relay Service Code (RSC2).

In an aspect, the relay device is arranged to forward, in the transfer request message (N), any nonce or freshness parameter received in the request message (M).

In an aspect, the relay device is arranged to keep track of the used nonces and discard any request messages containing a previously used nonce or abort the setup procedure.

The methods according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc.

The computer program product in a non-transient form may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is also provided a computer program product in a transient form downloadable from a network and/or stored in a volatile computer-readable memory and/or microprocessor-executable medium, the product comprising program code instructions for implementing a method as described above when executed on a computer.

Another aspect of the invention provides a method of making the computer program in a transient form available for downloading. This aspect is used when the computer program is uploaded into, e.g. Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which FIG. 6a shows a computer readable medium, and FIG. 6b shows in a schematic representation of a processor system.

The Figures are purely diagrammatic and not drawn to scale. In the Figures, elements which correspond to elements already described may have the same reference numerals.

DETAILED DESCRIPTION OF EMBODIMENTS

Figure 3:
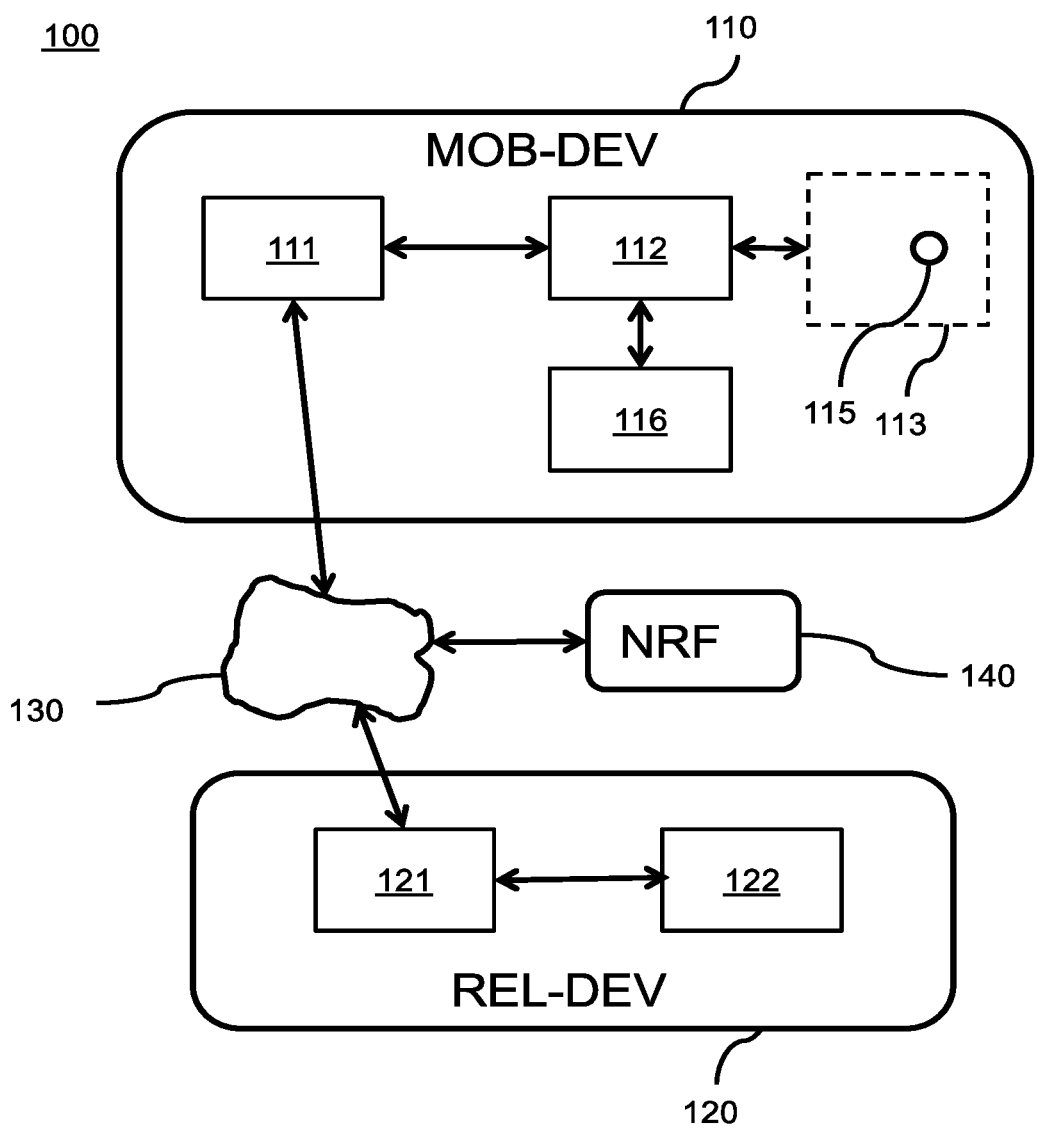
FIG. 3 shows a mobile device and a relay device and a network relay entity and a cellular communication network.

FIG. 3 shows a mobile device and a relay device and a network relay entity and a cellular communication network. In a cellular communication system 100, a mobile device 110 is arranged for wireless communication in a cellular communication network 130. The mobile device may, for example, be a mobile phone, a wearable medical device or a data communication unit embedded in a car. The cellular communication system (CCS) may include a radio access network (RAN) comprising multiple cellular base stations (BS) and a core network (CN). The cellular communication system provides a cellular network that supports network slicing and indirect connections.

Each network slice provides a logical network using a shared physical infrastructure of the cellular communication system. This is also typically the case for non-public networks (NPNs), in particular for public network operated NPNs. In case of a standalone NPN the logical network may also be deployed as a separate mobile core network and may operate a private small-cell infrastructure. Shared means that the physical infrastructure may be fully or partly shared. For example, some network functions of a first slice or NPN may be software running on other computers than the network functions of a second slice or NPN, while the RAN components may be fully shared between both slices or between both NPNs. Also, a first slice or NPN may be assigned to different frequency bands than a second slice or NPN, whilst the RAN components may be fully shared. Each indirect connection provides data transfer between a mobile device and the cellular communication system via at least one relay device. Another typical characteristic of network slices is that the network traffic related to a slice is isolated from other network traffic. The same holds for standalone NPNs.

As elucidated in the introduction, the cellular communication network may be an enhanced 5G network.

Figure 1:
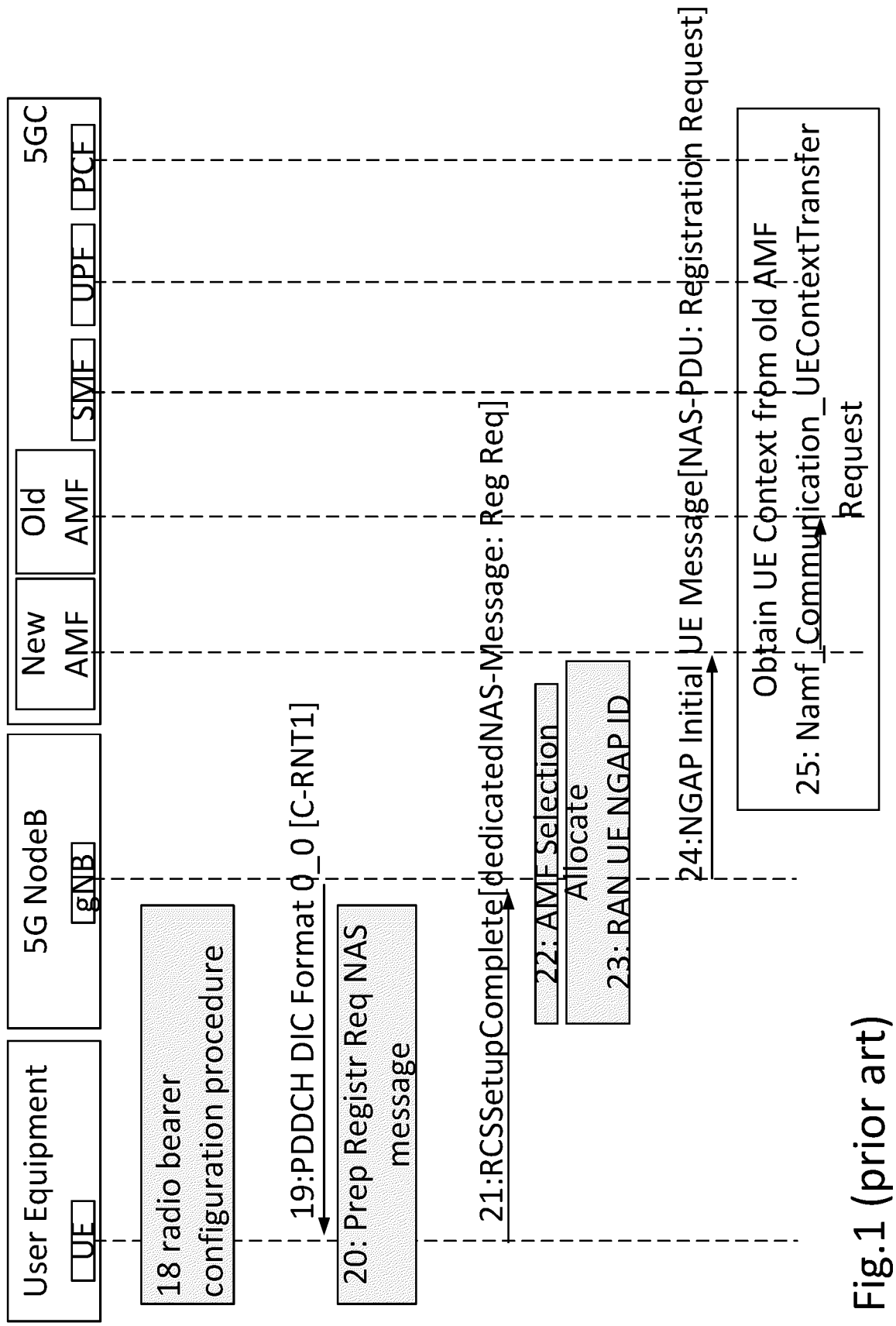
FIG. 1 shows an excerpt from a diagram showing User Equipment (UE) requesting a slice.
Figure 2:
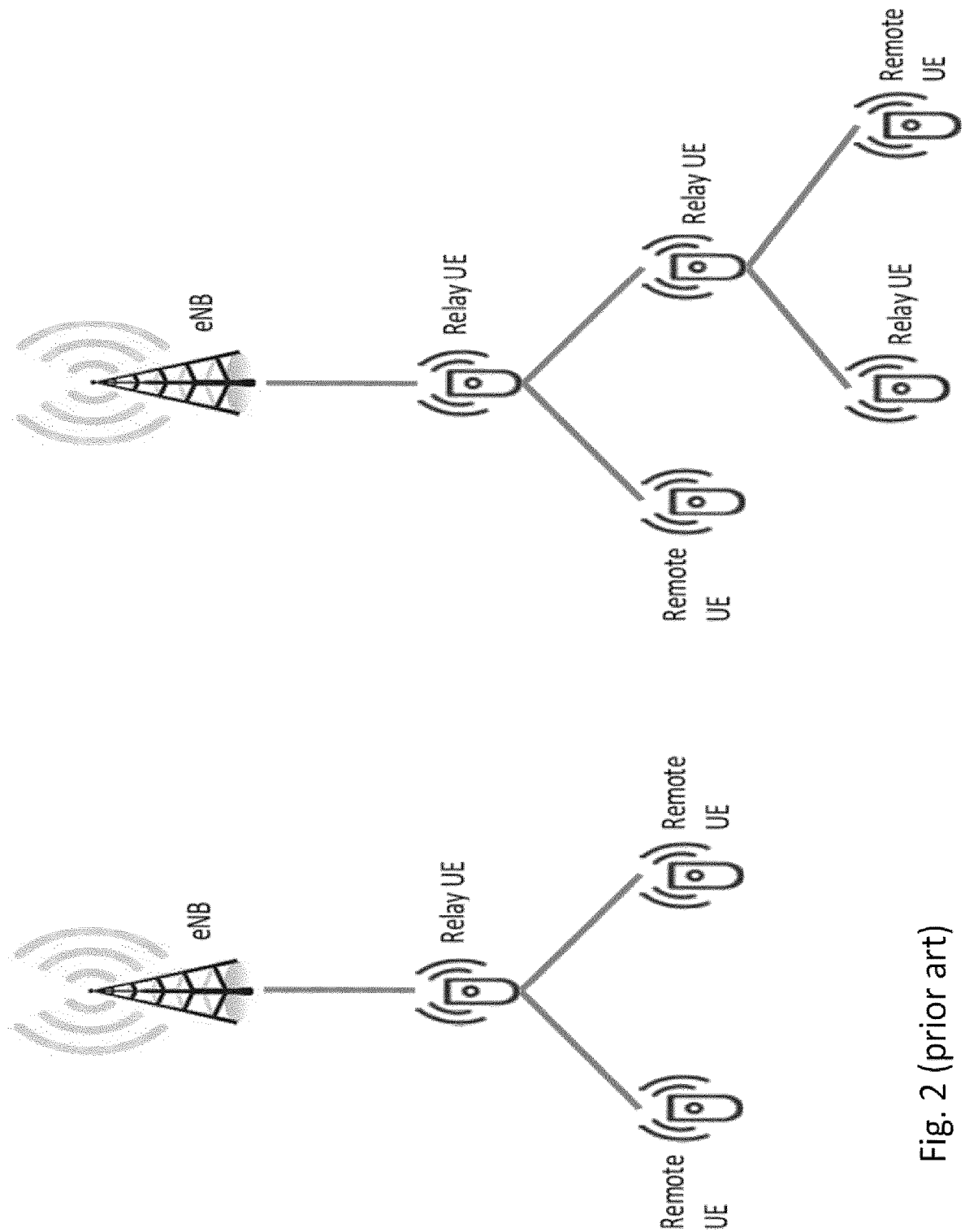
FIG. 2 shows an illustration of communication via Single hop (left) and Multi-hop (right) using UE-based relay devices.

FIG. 1 schematically shows the network 130 for providing communication between the mobile device MOB-DEV 110 and the relay device REL-DEV 120. The core network may be managed by at least one telecom provider, e.g. for managing a subscriber database and invoicing.

The network may also be coupled to network relay entity 140 providing a Network Relay Function (NRF) for managing the indirect connections. The network relay entity may be implemented on a processor system, e.g. provided at the core network, in the radio access network, or on a separate server on the Internet. The entity may be coupled wirelessly and/or wired, or via a dedicated link, to the network.

The relay device may be a mobile device arranged for communication with the radio access network and capable of supporting an indirect connection for data transfer to, and from, a mobile device. Note the difference with the multitude of indirect connections mentioned above that the NRF manages. The NRF might manage the indirect connections of thousands of UEs while the relay device only manages the indirection connection(s) of a mobile device in its vicinity.

The mobile device 110 may be arranged for wireless communication with the network and has a transceiver 111 arranged for the wireless communication, and a connection processor 112 arranged to control the mobile device and provide an interface to the user. The connection processor may be arranged for managing connections to the cellular network and provides a relay function 116 for managing at least one indirect connection as elucidated below. The mobile device may be provided with a user interface 113, e.g. including a display and one or more user input elements 115. For example, the user input elements may comprise one or more of a touch screen, various buttons, a mouse or touch pad, etc. Buttons may be traditional physical buttons, touch sensors, or virtual buttons, e.g. on a touch screen or icons to be activated via a mouse. The user interface may also be a remote user interface. The connection processor 112 may be coupled to a non-volatile memory 116.

The relay device 120 may have a relay processor 122 arranged for managing the communication in the cellular network and for managing an indirect connection to the mobile device as elucidated below, and a communication unit 121 arranged for wireless communication with the network. Relay processor 122 may be coupled to a non-volatile memory 123.

In the mobile device, the relay function may be arranged to perform the following. First a request message (M) is sent to at least one relay device (UEx). The request message may include a requested identifier (ID1) indicating a network slice which the mobile device is requesting access to. Next, at least one response message (N) is received from at least one relay device. The response message may contain an indication of at least one available slice for relaying via at least one relay device for providing an indirect connection. This indication may be explicitly defined (e.g. as part of an additional 'slice relay information' field in response message N), or implicitly (e.g. message N being an acknowledgement confirming the requested slice can be relayed via the respective relay device). Then, in dependence of the response message, a relay device (UEy) is selected from the at least one relay device that supports the requested slice. The response message may also include information about additional slices that can be supported from which the remote UE may make a selection. In the event that the remote UE is restricted to only a single, e.g. private, slice, or if there is only one available slice that is suitable for the UE, the selection is effectively taking such single slice. If the selected slice is the same as the requested slice, the remote UE may select the respective relay UE from which it received a response and may reuse the same device-to-device (D2D) connection (e.g. PC5) between the remote UE and the relay UE for setting up the indirect connection to the network via the relay UE. In the event that there only is a single, available relay UE that is suitable for the remote UE, the selection is effectively taking such single relay UE. Then, an indirect connection is engaged to the selected slice via the selected relay UE, which may reuse the same D2D connection between the remote UE and the relay UE used for sending request message (M) and/or receiving response message (N).

In the relay device, the relay processor may be arranged to perform the following. First the request message (M) is received from the mobile device. Then, a transfer request message (M') is sent to the cellular communication system in dependence of the request message. The transfer request message indicates a request to transfer data via an indirect connection to, and from, the mobile device. The transfer request message includes the requested identifier (ID1). The transfer request message may be either the same as message M or may be a newly constructed message by the relay device based on information received in message M or may be a message that encapsulates the contents of message M (e.g. as part of an IPSec tunnel, or by adding/changing some routing headers), or a variation thereof. The identifier that is sent as part of the transfer request message (M') may be a copy of the requested identifier (ID1), or may be an encrypted, encoded, hashed and/or scrambled of ID1, or may be a one-to-one mapped replacement identifier.

Then, a transfer response message (N') is received from the cellular communication system, the message being elucidated below. Then the response message (N) is sent to the mobile device in dependence of the transfer response message.

In the network relay entity, the Network Relay Function (NRF) is arranged to perform the following. First at least one transfer request message (M') is received via at least one cellular base station. Then relay capability data is obtained regarding relay devices capable of data transfer for at least one available slice to, and from, the mobile device. The available slice(s) are determined in dependence of the requested identifier (ID1). Next, at least one transfer response message (N') is sent via at least one cellular base station. The transfer response message includes network relay information indicating at least one available slice and at least one relay device capable of transferring data of the available slice.

Optionally, the transfer response message (N') comprises, in the network relay information, a set (T) of relay devices. Also, or alternatively, the response message (N) comprises (e.g. in a slice relay information field), a set (T) of relay devices. For example, the set of relay devices may be an ordered list of available relay devices, e.g. ordered on preference level or suitability.

Optionally, a respective transfer response message may only go to one specific relay device and a response message may indicate the relay device itself as the relay device. Such messages may only implicitly indicate that relay device. Therefore, the message may not explicitly indicate a relay device in a some 'Relay ID' or similar message element. Instead, the message may, e.g. only include the network address of the specific relay as a destination address in the message header. The relay device may be implicitly indicated by a destination address of the relay (e.g. in case of a transfer response message (N')) or by a source address of the relay (e.g. in case of a response message (N)). For example, a use case may have 3 relay devices a, b, c that each respond to the mobile device's broadcast with information about their own slice(s) they can support towards mobile device. Then the message N doesn't need to list any relay (capable) devices, because each relay (a/b/c) answers on its own behalf. In the message format in this case the identity of the relay (a/b/c) may only be found in the standard 'source' field in the message headers, e.g. the MAC source address. It may be absent in the higher-level message or it may be indicating itself. The mobile device selects one of the relay devices from which it received the respective response messages and engages an indirect connection via the selected relay device.

Optionally, a respective transfer response message comprises instructions for various actions. There may be instructions to reconfigure an existing PDU session between the relay device and the network to accommodate relaying network traffic for a particular slice (e.g. change the DNN, connect to different User Plane Function), to update the UE configuration (possibly including information such as different S-NSSAI information, different policy information, different credentials) which will trigger the device to reconnect to the network by breaking the existing PDU session and setting up a new PDU session, which may lead to selecting a different Access and Mobility management Function (AMF) to serve the network slice. The transfer response message may include instructions to initiate additional PDU sessions with the network, in case the Relay UE is already serving other Remote UEs, and may also include instructions to connect to a different PLMN/NPN. The transfer response message may also include instructions to camp on specific cells related to a Closed Access Group (CAG) ID to access a slice, in particular in case of a public network operated NPN.

Optionally, a respective transfer response message comprises, in the network relay information, instructions/information on resource scheduling requirements for the base station based for the available slices (e.g. related to the characteristics, QoS flows, minimum/maximum/preferred bitrates, priorities, frequency bands, bandwidths, division of resources across different slices), the resource scheduling requirements being used by the base station to schedule sidelink resources for the mobile device and the available relay devices or the selected relay devices for communication of the available or selected slices. Alternatively, the instructions/information on resource scheduling requirements for the base station based for the available slices may be sent as a separate message from the NRF to the base station (or a nearby base station) either directly or routed/ tunneled via the AMF (in a case where the NRF is not integrated with the AMF).

Optionally, the respective transfer response message may comprise some configuration update information or authorization update information or policy update information for the Remote UE that has been out of coverage for a while. This information could be forwarded by the Relay UE to the Remote UE using response message N. This information may be encrypted using security credentials only known to the Remote UE to prevent this information to be exposed to the Relay UE More specifically, a cellular communication system involves a mobile device UE0 operating as cellular communication User Equipment, a set S of relay devices {UE1, . . . UEn}, n>=1 operating as cellular communication User Equipment and further being capable of relaying network traffic from UE0 to/from a cellular communication system CCS capable of supporting relay operation and network slicing.

Device UE0 may operate as follows.

Device UE0 sends a message M to a relay device UEx of set S. The message includes an identifier which may be a network slice identifier ID1 which device UE0 is requesting access to. ID1 may be an S-NSSAI (as defined in 3GPP [24.501]) optionally being part of a set of slice identifiers. Alternatively, the message may include a temporary slice identifier (as defined in 3GPP [33.813]) (complete or as a hash value), or an encrypted slice identifier (as defined in 3GPP [33.813]). Note that in such a case, it would be convenient that the core network keeps a list of previous temporary identifiers to see if there is a match, since the remote UE may have been out-of-coverage for a while, and hence the temporary identifier may not be up to date anymore. Alternatively, the message may include a combination of PLMN and a Network Identifier (NID) or a CAG ID, to denote a slice, in particular in case of NPN. The message may include any other type of identifier (e.g. pre-configured in the UE, or regularly updated upon or after registration, or derived from a derivation function or mapping table that may be uniquely pre-configured for each UE) from which the NRF (e.g. AMF/NSSF/ProSe function or other network function) or relay device UEx can derive (e.g. using hash table or other type of mapping function) which slice is requested by device UE0.

Message M may e.g. be a D2D/PC5 discovery message (as defined in 3GPP [23.303]) with an additional information element to indicate a requested network slice identifier, or a PC5 Direct Communication Request (as defined in 3GPP [23.287]) with an additional information element to indicate a requested network slice identifier, or by using the requested identifier (ID1) as (V2X) service code or application ID, or a PDU Session Establishment Request (as defined in 3GPP [24.501]) with an additional information element to indicate a requested network slice identifier, or a Registration request (as defined in 3GPP [24.501]) using existing 'Requested NSSAI' attribute, or UL NAS TRANSPORT (as defined in 3GPP [24.501]) using existing 'S-NSSAI' attribute, or another type of PC5/NAS/RRC message with an additional information element to indicate a requested network slice identifier.

Device UE0 receives a message N from device UEx. The message may include a network slice identifier ID2, for example as part of an additional slice relay information field. ID2 may be the same as ID1, or an instance identifier, or an allowed slice identifier, or a default slice identifier. Alternatively, message N may include information about a subset S' of S that UE0 is allowed or not allowed or preferred to use for setting up an indirect connection session with the network slice of cellular communication system CCS identified by ID2. As another alternative, message N includes a boolean or set of boolean values indicating support for a set of requested and/or supported slices. In yet another alternative, message N is an acknowledgement that a match has been found between a requested slice and a list of slice IDs that the mobile device can connect to via the eRelay UE. Message N may only be sent if it is possible for relay device UEx to act as relay for device UE0 for an indirect communication session within the requested network slice. Message N may be formatted e.g. as a D2D/PC5 discovery response message (as defined in 3GPP [23.303]), or a PC5 Direct Communication Accept message (as defined in 3GPP [23.287]), or a PDU Session Establishment Accept message (as defined in 3GPP [24.501]), or a Registration Accept message (as defined in 3GPP [24.501]), or DL NAS TRANSPORT (as defined in 3GPP [24.501]) using existing 'S-NSSAI' attribute, or another type of PC5/NAS/RRC message.

Device UE0 selects a relay device UEy of set S for communicating with the cellular communication system CCS. UEy may be different from UEx, if device UEx is not allowed or not preferred to be used for setting up an indirect connection with the requested network slice.

It is noted that, optionally, the relay UE may reply via message N on its own, e.g. based on preconfigured information from the NRF, that it can serve a certain slice, e.g. because it is part of the same slice, has the same security context, and has sufficient resources to act as relay for the remote UE. This option could work also for a default slice, e.g. operating in the same PLMN, and for relays that operate in a private slice, e.g. operated and configured by a same third party to be part of the same group, or belong to a special group of devices, e.g. Public Safety UEs. Optionally, the NRF may preconfigure a relay UE for a set of slices, e.g. default slice and/or specific private slice that relay UE can operate in, and optionally for related policy rules, for example when the relay UE is authorized, enabled or gets resources to reply to relay discovery messages. This may for example be done by sending a message containing preconfigured slice relay information to the relay UE beforehand.

Relay devices UEx (1<=x<=n) may operate as follows.

Device UEx receives a message M from Device UE0, the message including a network slice identifier ID1 which device UE0 is requesting access to.

Device UEx sends a message M', at least partially based on message M, to cellular communication system CCS, either directly or via one or more other relay devices UEy (1<=y<=n); Device UEx receives message N' from cellular communication system CCS, the message including a network slice identifier ID2 and information about a subset S' of S that UE0 is allowed or not allowed or preferred to use for setting up a relayed communication session with the network slice of cellular communication system CCS identified by ID2; Device UEx sends message N, at least partially based on message N', to device UE0.

Message M' may be, for example, a ProSe match report (as defined in 3GPP [24.334]) or another message over the PC3 interface with some additional field(s) to indicate information about the requested slice by UE0, or a NAS message (as defined in 3GPP [24.501]) with some additional field(s) to indicate information about the requested slice by UE0. In case of layer 2 relay, message M' may be the received PDCP frame containing the NAS message as received from device UE0 that is transparently forwarded by the relay device UEx over its Uu interface to the base station/core network (or other PC5 interface to a subsequent relay device). It may also be a new dedicated NAS or RRC message (e.g. relay request message) containing the required information about the requested slice by UE0.

In the cellular communication system CCS, the relay device UEx may be communicatively coupled via a base station BS of the multiple cellular base stations of the RAN. In the CCS a Network Relay Function (NRF) is provided. The base station may be communicatively coupled to an Access and Mobility Management Function (AMF) in the CN. The core network may host multiple Access and Mobility Management Functions assigned to different slices. The base station may select the proper AMF based on the requested slice identifier ID1 received in message M'.

The base station BS may be able to receive message M' from relay device(s) UEx and may either forward the message to the NRF. The base station BS generates a new message to the NRF based on the received message, or interprets the message M' via the NRF, e.g. through a built-in NRF. The forwarded message may be a NAS message. The new messages may, e.g. be initial registration messages, UE context information messages or other NG Application Protocol (NGAP) messages over the N2 interface similar to the S1 Application Protocol S1AP over the S1 interface in 4G.

The CCS may also host different Network Relay Functions or different instances of the NRF may be assigned to different slices. The base station may select the proper NRF based on the requested slice identifier ID1 received in message M' and forward the message to the selected NRF. In case the NRFs are not directly coupled to the base station, but to the AMF, the AMF may select the proper NRF based on the requested slice identifier ID1 received in the message it receives from the base station.

In the CCS, the Network Relay Function (NRF) may operate as follows:
- a message M', or a message M" at least partially based on message M', is received from the Access and Mobility Management Function (AMF) or directly from the base station BS, the message including a network slice identifier ID1 which UE0 is requesting access to;
- information I is obtained about a set T of UEs capable of relaying network traffic from UE0 to/from the RAN, and the capabilities of these UEs;
- relay devices are determined, in part based on the received message M" and the obtained information I. The relay devices may constitute a subset T' of T consisting of UEs that UE0 is allowed or not allowed or preferred to use as a relay device for setting up a relayed communication session with the network slice of cellular communication system CCS identified by ID1;
- a message N" may be sent back to the AMF or to base station BS. The message N" may include information about subset T' and a network slice identifier ID2.

Finally, the AMF or base station BS, send a message N', at least partially based on message N', to relay device UEx. Note that the message may, also or alternatively, be addressed directly to the remote UE (e.g. through the AMF), or the subset of relay UEs, or may be addressed to an intermediary node, e.g. a Base Station to which said relay UE is connected, which then forwards the information in a new message to the relay UE.

The NRF-assisted relay selection is described via a requesting UE during discovery, where UE selects based on NRF preselection. A UE may be configured to connect to one or more network slices and may be further configured to discover nearby relay capable UEs under certain circumstances. e.g. out-of-coverage of the base station, based on a configured policy. In order to discover nearby relay capable UEs, the UE sends a D2D/PC5 discovery message which may include a new attribute indicating one or more IDs of slices that it wants to connect to. The relay capable UEs in radio range may receive this message and may each report the information from the message to the Network Relay Function (NRF) in the Core Network (CN). The message specifically includes the information of the ID(s) of slice(s) that the UE is requesting.

From the received information, NRF determines which (potential or already-active) candidate relay UEs are able and/or allowed and/or would optimally serve the requesting UE with the requested slice(s), or a subset thereof if the full set is not attainable. To this end, the NRF may need to request/receive information from other network functions (such as Access and Mobility Management Function (AMF)—where NRF and AMF are not integrated—or the Radio Access Network (RAN)) or request/receive information directly from the relay UE, further details about the capabilities, context information, connectivity properties, and other information such as mobility/location/speed information from each of the relay capable UEs within discovery range of the UE, or that are otherwise capable or involved in (e.g. in case of multi-hop relay) setting up an indirect connection from the UE to the Radio Access Network. The NRF may use this information together with other information it may request/receive from other network functions, such as the Policy Control Function (PCF), Unified Data Management (UDM), Network Slice Selection Function (NSSF), . . . ), where the NRF is not integrated into these network functions, to assess whether or not each of these candidate relay UE's is allowed, capable, and has sufficient resources available and would be able to attain the required QoS to serve as relay UE for the requested network slices. In addition, the NRF may request information about the 'reputation as relay UE', e.g. from the Network Data Analytics Function (NWDAF), since the relay UE can have a 'bad reputation' (or record) when it comes to serving as relay, e.g. it may drop connections, perform denial-of-service by ignoring all the remote UE's traffic, throttle the bandwidth of the remote UEs, etc.

In addition, the NRF may take other criteria into account such as RAN congestion or whether a base station or AMF/MME to which a candidate relay UE connects to is close to or has already reached a certain maximum number of UEs/PDN connections per slice and may provide a different candidate relay UE for the requesting UE to connect to.

Also, the NRF may use preliminary UE subscription information to check whether the UE is allowed to operate in the slice(s) it requested. Note: because the UE did not authenticate yet with the core network at this point, and it only sent information related to its identity via the relay discovery request, which may be unauthenticated data (i.e. could be easily forged/changed), the NRF does not use this information to authenticate the UE. But only as guidance in the selection process.

When the Network Relay Function (NRF) receives the requested identifier (ID1) in a transfer request message (M') it may use ID1 to obtain relay capability data regarding relay devices capable of data transfer to/from a specific network slice based on the characteristics of that network slice indicated by ID1. However, in case of a roaming Remote UE the NRF may not know the identifier ID1 nor the characteristics of the slice indicated by it. Alternatively, the NRF does know the identifier ID1 but with different slice characteristics because the identifier ID1 is used by both the operator of the Relay UE and the operator of the Remote UE for different purposes. In other words, there may be overlap between identifiers if operators do not use a mutual agreement on the values of identifiers such as ID1. To solve these potential issues, a NRF may after receiving M' contact the NRF of the Home PLMN (HPLMN) of the Remote UE (if known) or may contact the AMF (or database) of one or more other PLMNs, using for example a request message M" to the HPLMN NRF, to obtain the characteristics of the slice indicated by ID1 and may also validate if the Remote UE is authorized to connect to the slice indicated by ID1. Once the characteristics of the slice are retrieved, for example via a response message N" from the HPLMN NRF, then the NRF may configure the Relay UE with parameters to support relaying for the slice indicated by ID1, for example sending the Relay UE a security key or parameter from which the Relay UE may derive a security key. The NRF may include such configuration information fully or partially into the transfer response message N', or it may include configuration information in other, separate messages. The NRF may also configure the PDU session of the Relay UE and/or Remote UE in dependence of the retrieved characteristics of the slice indicated by ID1, for example to optimally meet the QoS service requirements of the particular slice. Also, the NRF may configure parameters on the gNB that is serving the Relay UE, for example to optimally meet the QoS service requirements of the particular slice which may include communication latency requirements or data throughput requirements.

Another solution is to coordinate the allocation of identifiers such as ID1 between operators, for example an operator makes agreements with all operators for which it enables roaming of UEs from the other operator on its own cellular network(s).

The NRF may then send a message back to one or more chosen candidate relay UE(s) with the message for each relay UE including a set of slices that can be offered to the requesting UE via that specific relay UE. In other words, for each candidate relay UE a set of 'Accepted slice IDs' is included. The NRF may also include a set of 'Rejected slice IDs' in case the full set of requested slices was not attainable, or if the relay UE is not allowed to be used as relay UE for network communication of the requested slice. The received slice information can also be an instance identifier, or an allowed slice identifier, or a default slice. Optionally, the message may contain information about a list of other possible candidate relay UEs that could be used to set up an indirect connection to the core network in order to gain access to the requested slice. This list may be ordered according to preference or suitability to serve as relay UE for the requested slice.

Each relay UE that receives such message will then use the information from the message to send a discovery response back to the requesting UE, optionally containing the slice information (or other information from which the requesting UE can derive whether the relay UE can support relay communication for a requested slice), and optionally the information about other candidate relay UEs. Because a (potential) relay UE communicates with NRF before sending a discovery response to the requesting UE, the discovery response by the relay UE could potentially be sent a bit later than expected by requesting UE. In this case the relay UE can send a preliminary discovery response, indicating that it is present but that further information including slice information is still to be sent later, pending NRF/CN approval.

Based on the received discovery responses it received from candidate relay UE, the UE can now select the best candidate relay UE to connect to, and then connects to it, e.g. by procedures similar to ProSe, and via Core Network procedures it connects to the requested slice(s) or the attainable subset thereof. Alternatively, the NRF selects only a single relay UE and instructs the relay UE to connect to the UE requesting a relay connection to the requested slice.

Figure 4:
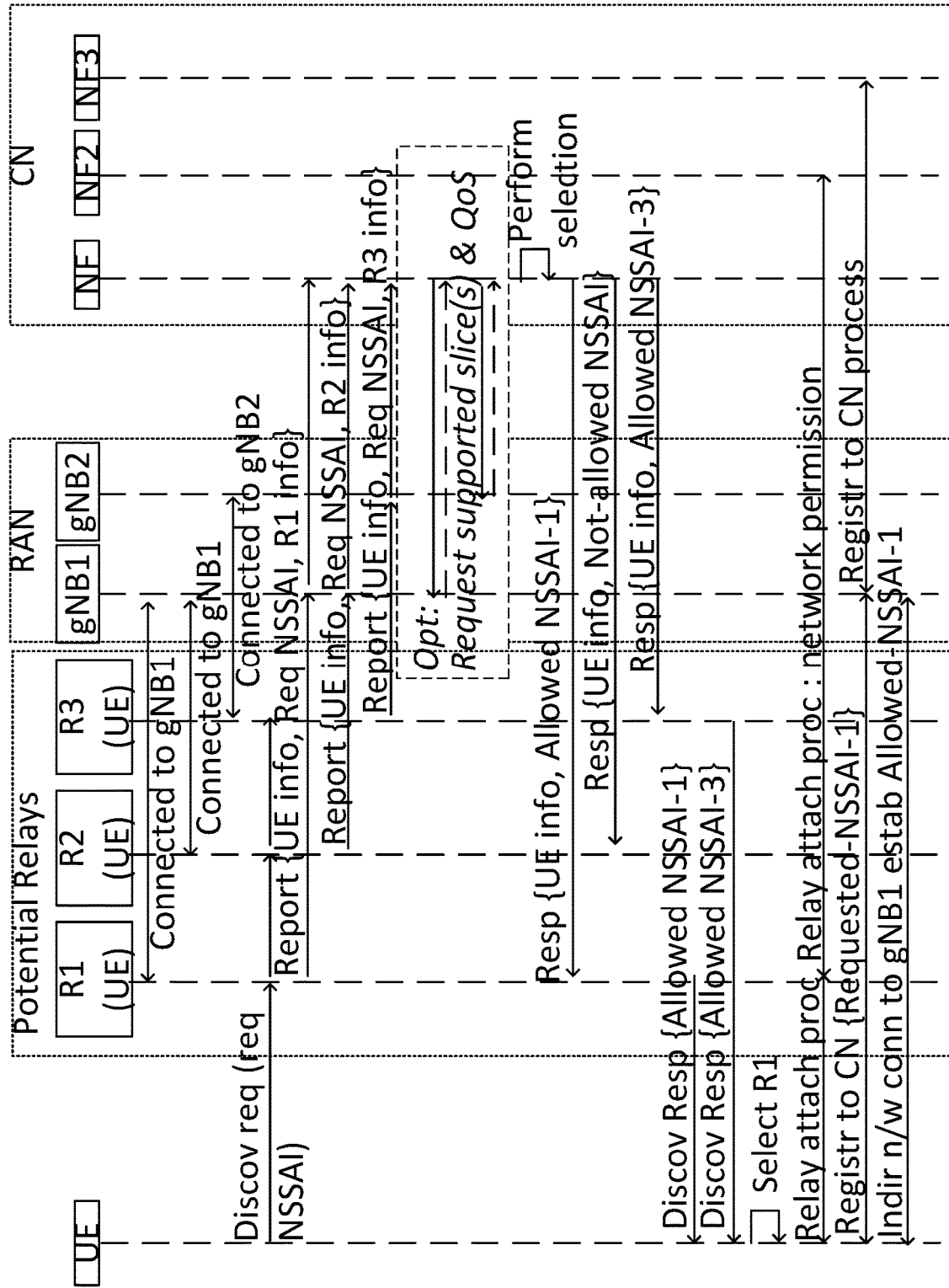
FIG. 4 shows an example of an NRF-assisted relay selection sequence diagram.

FIG. 4 shows an example of a NRF-assisted relay selection sequence diagram. The Figure schematically provides an example flow and message sequence. In the Figure NF is the Network Relay Function NRF as described above;

NF2 is an optional extension to the NRF (or the ProSe function) that handles providing permission for a relay UE to accept a new remote UE;

R1, R2, R3 are relay UEs or potential relay UEs; assumption here is that R3 is connected to a different gNB, i.e. gNB2. In this example message sequence, detailed information about each relay UE (e.g. capabilities, signal quality, etc.) is sent directly to the NF, to reduce the time for the NF to acquire all this information;

The 'opt' box denotes optional communication to request further information about slices, QoS, but possibly also information about other potential relay UEs in vicinity, measurement information, location/mobility information of the different UEs, etc. from RAN. Currently it is shown as information to request from RAN, but information may also need to be requested from the AMF, PCF, UDM, NSSF, or other network functions. It is shown as optional since, the NRF may already have received this information beforehand;

NSSAI is a set of up to 8 slice IDs, as further described in 3GPP specification [23.501].

The connection processor in the mobile device may be arranged to initiate a relay discovery process and to engage an initial indirect connection. Subsequently, the connection processor sends the request message via the initial indirect connection. The network relay entity (140) or the relay function may be arranged to reconfigure the initial indirect connection to said indirect connection to the selected slice via the selected relay device. So, an active relaying UE may be reconfigured to uses another relay, where the UE initially selects an initial relay and the NRF or the UE reconfigures the selection. A UE that needs to select a relay UE sends a D2D/PC5 message to initiate relay discovery. Relay UEs and potential relay-capable UEs in radio range will receive this message and will respond with a discovery response using state-of-art procedures, possibly ProSe procedures. Then the UE picks a suitable relay UE candidate, even without yet knowing if this relay UE will fully support all its required slices and connects to it. Over the relay UE connection, 5G network registration and/or a PDU session establishment is performed by the UE using state-of-art procedures, which includes a request for one or more slices.

The NRF may be involved in the process as follows. Once the NSSAI requested by the UE is received by a base station or the Access and Mobility Management Function (AMF), the NRF may be informed about this, after which the NRF may determine which (potential) relay UE or set of relay UEs are able and/or allowed and/or would optimally serve the requesting UE with the set of requested slices, in the same manner as described earlier. Then, if the NRF determines that the most suitable relay UE for the UE requesting access to one or more slices is another relay UE than the current one it sends a reconfiguration message (e.g. CONFIGURATION UPDATE COMMAND as defined in 3GPP [24.501]) to UE. The message may be sent directly or addressed via intermediaries like gNB or relay UE and may indicate in a new attribute in the message the ID or the address of the relay UE to use preferably and the set of slices that are attainable with that relay UE. The set may be larger than the current supported slices for UE. In addition, the NRF may also send a list of relay UEs along with preference level and/or set of slices for each. Alternatively, information about which relay UEs may or should be used for a specific slice can be provided as a new extension to the UE route selection policy (URSP) as defined in 3GPP [29.507] [23.503], which can be sent to the UE using the UE policy delivery protocol defined in Annex D of 3GPP [24.501].

Upon the UE receiving the reconfiguration message or the updated URSP, and depending on the information received, the UE may either continue using the relay UE it is already using, or it may need to perform relay UE discovery again, optionally by specifically searching for the new preferred relay UE during this discovery and connect to it.

As an additional example, an enhanced ProSe (eProSe) scenario in 5G is described, which embodies a reconfiguration to another eRelay UE (enhanced relay UE) that better supports the requested slices. The example scenario illustrates how it may apply to the 5G system architecture. The scenario assumes that relay capable devices have already activated their relay function, thus are acting as relay device with permission of the 5G network. On-demand activation of relay function in relay capable devices is also possible but is not further described.

The example eProSe scenario involves the following. A mobile device UE that has lost its connection to the 5G Core Network and is unable to re-establish it, starts a procedure of eProSe eRelay Discovery model B using eRelay Open Discovery. The mobile device executes the role of eRemote UE in this procedure. The mobile device first checks in its UE configuration if authorization for doing this procedure is granted, by the ProSe Function, for out-of-coverage situations. If this is the case, it checks in its UE configuration if the ProSe Function authorized it to act as an eRemote UE when out-of-coverage. If that is also the case, it sends a PC5_DISCOVERY message of type eRelay Discovery Solicitation to request nearby eRelay UEs (which may also be called eProSe UE-to-Network relay UEs). This message is sent via sidelink (SL) spectrum resources. In this example, Open Discovery is used which means the broadcast request is not protected by encryption: any eRelay UE can parse the request without requiring a specific security context or key. Alternatively, not further detailed here, the secure discovery procedure called eRelay Restricted Discovery may be used to prevent potential leakage of information.

Subsequently, each eRelay UE reports the received information and/or request parameters from the mobile device to the ProSe Function using a message such as for example ProSe MATCH_REPORT over the PC3 interface, or the 5G eProSe equivalent thereof. The ProSe Function collects all the MATCH_REPORT messages that are sent by eRelay UEs. It determines per message what the response should be and sends each response message back to the respective eRelay UE, using for example the MATCH_REPORT_ACK message over the PC3 interface or the 5G eProSe equivalent thereof. Each eRelay UE that receives such message (i.e. the message that is e.g. implemented as MATCH_REPORT_ACK over PC3) will based on its contents send a response message to the mobile device. That response message is e.g. implemented as a PC5_DISCOVERY message of type eRelay Discovery Response over interface PC5-D. The mobile device receives this message from one or more eRelay UEs, which allows it to select one eRelay UE that seems suitable to connect to using e.g. the decision process already standardized for 4G ProSe or the 5G eProSe equivalent thereof.

Subsequently, using the selected eRelay UE, the mobile device continues the 5G Core Network attachment procedure where the communication is relayed by the selected eRelay UE at MAC layer, that is, L2. This procedure may, for example, include the mobile device, in its role as eRemote UE, sending an INDIRECT_COMMUNICATION_REQUEST message to the eRelay UE over PC5, based on which the eRelay UE sends a message to a relevant network function which could be implemented as sending a UE triggered Service Request message or similar to the Access and Mobility Management Function (AMF) or to the ProSe Function in the 5G Core Network such that the 5G core network can decide on what response is to be sent by the eRelay UE towards the mobile device. The response from the core network is sent by a 5G network function, such as AMF or ProSe Function, towards the eRelay UE, based on which the eRelay UE sends a response message such as INDIRECT_COMMUNICATION_RESPONSE to the mobile device over the PC5 interface. After a positive response that can be processed successfully, the mobile device will execute a process similar to the existing 5G core network registration process—with a main difference that the messages sent by mobile device are not sent directly to a Base Station but are relayed via the eRelay UE to a Base Station and eventually to the Core Network. The registration process starts with the 5G-NR RRC Connection Setup procedure, this procedure being finalized by the mobile device sending the RRCSetupComplete message to the Base Station that includes the NAS Registration Request. The NAS Registration Request in turn includes the element Requested NSSAI, per standard 5G procedure. Based on this procedure the Base Station (gNB) initiates the registration of the UE to the 5G Core Network which starts with forwarding the said NAS Registration Request of the mobile device towards the AMF. The NAS Registration Request, that contains the Requested NSSAIL serves as the transfer request message. The AMF in this case largely implements the NRF as described herein. The AMF (potentially being aided by other network functions, e.g. ProSe Function—this would constitute a distributed NRF) determines the optimal eRelay UE that the mobile device should connect to in order to satisfy its Requested NSSAI best, and also determines the Allowed NSSAI i.e. set of slice IDs (S-NSSAI) that the optimal eRelay UE can serve. In response to the NAS Registration Request the AMF constructs the response message NAS Registration Accept, which includes a new information element that indicates the 'Allowed NSSAI served by the optimal eRelay UE' along with the identity/address information of the optimal eRelay UE. Note that the AMF could alternatively include multiple eRelay UEs with a set of Allowed NSSAI per each eRelay UE included, so the mobile device is enabled to select an eRelay UE from a set of multiple 'optimal' eRelay UEs. The NAS Registration Accept is delivered back to the Base Station.

Subsequently, based on the above received message, the Base Station sends a message, for example RRC Reconfiguration, which includes as a new element in that message the information about 'Allowed NSSAI served by the optimal eRelay UE' along with indication of the optimal eRelay, or alternatively a set of multiple eRelays with their Allowed NSSAI. This triggers the mobile device to evaluate the new information, to detect that there is another eRelay UE that can better serve it with the indicated slices in the Allowed NSSAI, and to restart the relay procedure by connecting via the indicated optimal eRelay UE. This process optionally can involve renewed discovery of eRelay UEs.

Additionally, the 'Allowed NSSAI served by the optimal eRelay UE' information may be complemented by an optional field for each eRelay UE that indicates which security context ID or application ID the mobile device should use to discover that eRelay UE correctly.

Below, a second eProSe scenario in 5G is described, in which scenario slice information is present in eProSe discovery, Model B messages to enable the UE to select the optimal relay device directly. Also, this example scenario assumes that relay capable devices have already activated their relay function.

The second eProSe scenario involves the following. A mobile device UE that has lost its connection to the 5G Core Network and is unable to re-establish it, starts the procedure of eProSe eRelay Discovery model B using eRelay Open Discovery. The mobile device executes the role of eRemote UE in this procedure. The mobile device first checks in its UE configuration if authorization doing this procedure is granted, by the ProSe Function, for out-of-coverage situations. If this is the case, it checks in its UE configuration if ProSe Function authorization for acting as an eRemote UE when out-of-coverage is granted. If that is also granted, it sends a PC5_DISCOVERY message on sidelink (SL) spectrum of type eRelay Discovery Solicitation to request nearby eRelay UEs (which may also be called eProSe UE-to-Network relay UEs) to respond with relay information. In this example, Open Discovery is used which means the sent broadcast request is not protected by encryption such that any eRelay UE can parse the request without requiring a specific security context or key. Alternatively, the secure discovery procedure eRelay Restricted Discovery may be used to prevent potential leakage of information but this is not further discussed. The eRelay Discovery Solicitation message may include an additional element 'Requested NSSAI' which is a list of one or more slice IDs (that is, a list of S-NSSAI) that the mobile device would like to be connected to via an eRelay UE.

Subsequently, each eRelay UE reports the received information/request including Requested NSSAI from the mobile device to the ProSe Function using a transfer request message such as for example MATCH_REPORT over the PC3 interface or the 5G equivalent thereof. The ProSe Function implements the Network Relay Function and collects all the transfer request messages. It determines for each eRelay UE which of the slices in the Requested NSSAI the eRelay UE could provide to the mobile device via an indirect connection. The determination may involve communication with other network functions e.g. RAN, Base Stations, AMF, servers containing MNO subscription information, etc. to obtain an optimal decision of slices that can be supported.

Subsequently, the ProSe Function sends a transfer response message back to each of the respective eRelay UEs, using for example the MATCH_REPORT_ACK message over the PC3 interface or the 5G equivalent thereof. This message to a given eRelay UE optionally contains an additional information element, 'Allowed NSSAI' which is a list of one or more slice IDs (that is, a list of S-NSSAI) that the mobile device can connect to via that eRelay UE; and it optionally contains an additional information element, 'Rejected NSSAI', which is a list of one or more slice IDs for which access via that eRelay UE is determined to be not feasible by the ProSe Function.

Subsequently, each eRelay UE that receives that message (i.e. the message that is e.g. implemented as MATCH_REPORT_ACK over PC3) will send a response message to the mobile device that is e.g. implemented as a PC5_DISCOVERY message of type eRelay Discovery Response over interface PC5-D that is sent to mobile device. This message now includes as a new element, the slice IDs that were included in the MATCH_REPORT_ACK. The new element is an optional Allowed NSSAI in case the given eRelay UE is capable of acting as eRelay UE for the mobile device for certain slice(s), and the optional Rejected NSSAI in case the eRelay UE is rejected by the ProSe Function to act as eRelay UE for mobile device for certain slice(s). Alternatively, the response message includes as new element a boolean or set of boolean values indicating support for a set of requested and/or supported slices. Alternatively, the response message is a differently formatted message acknowledging that a match has been found between a requested slice and a list of slice IDs that the mobile device can connect to via the eRelay UE. The response message may only be sent if it is possible for the given eRelay UE to act as relay for the mobile device for the requested network slice.

Subsequently, the mobile device receives this message from one or more eRelay UEs, which allows it to select for example one eRelay UE that serves all or the most network slices that it had indicated in its Requested NSSAI initially. Or alternatively the mobile device could select an eRelay UE that does not offer most network slices, but it does offer the one most important (highest priority) network slice that the mobile device would like to be connected to. Using the selected eRelay UE, the mobile device continues the 5G Core Network attachment procedure where the communication is relayed by the selected eRelay UE at L2. This procedure may for example consist of the mobile device, in its role as eRemote UE, sending first an INDIRECT_COMMUNICATION_REQUEST message to the eRelay UE over PC5, based on which the eRelay UE sends a message to a relevant network function which could be implemented as sending a UE triggered Service Request message or similar to the Access and Mobility Management Function (AMF) or ProSe Function in the 5G Core Network such that the core network can decide on the contents of the response to be sent by the eRelay UE to the mobile device. The response from the core network is sent by a network function towards the eRelay UE, based on which the eRelay UE sends an INDIRECT_COMMUNICATION_RESPONSE to the mobile device over the PC5 interface. After a positive response that can be parsed successfully, the mobile device will initiate a process similar to the usual 5G core network registration process—with a key difference that related traffic is relayed via the eRelay UE. The process starts with the 5G-NR RRC Connection Setup procedure, which is finalized by the mobile device sending the RRCSetupComplete message to the Base Station that includes the Requested NSSAI, again, per standard 5G procedure. Based on this procedure the Base Station (gNB) initiates the registration of the UE to the 5G Core Network which includes the connection to one or more network slices.

In a third eProSe scenario in 5G, the discovery process is skipped and instead a requested slice identifier is sent as part of the INDIRECT_COMMUNICATION_REQUEST message to the eRelay UE over PC5, upon which the eRelay UE, after performing a message exchange with the AMF or ProSe Function (or other network function) to confirm whether or not the eRelay UE is capable and allowed to act as relay for communication of the eRemote UE with the requested network slice, sends an INDIRECT_COMMUNICATION_RESPONSE that includes information (e.g. set of allowed slice IDs, boolean indicating support for a requested slice) to confirm that the eRemote UE can connect via the eRelay UE with the requested slice.

In another alternative, relaying may be done at layer 3 or via an application-level relay, in which case a DIRECT_COMMUNICATION_REQUEST message (e.g. as defined in 3GPP [23.287]) respectively a DIRECT_COMMUNICATION_ACCEPT message (e.g. as defined in 3GPP [23.287]) may be used instead of the INDIRECT_COMMUNICATION_REQUEST and the INDIRECT_COMMUNICATION_RESPONSE messages.

In a further example scenario, a vehicle mobile device may communicate to some destination in the network (V2X). A car UE may use V2X 5G communication on two specific slices, 'V2X' and 'entertainment', may lose its gNB coverage at some point. The car UE initiates discovery of relay UEs and finds 10 candidates belonging to different PLMNs. Two of the candidates indicate in their discovery response message specific support for both the V2X and entertainment slices. The car UE selects one of these two with the highest signal quality and initiates a connection as remote UE to that relay UE. During the Core Network registration process both the slices are indicated as 'Allowed NSSF' for the car UE.

Figure 5:
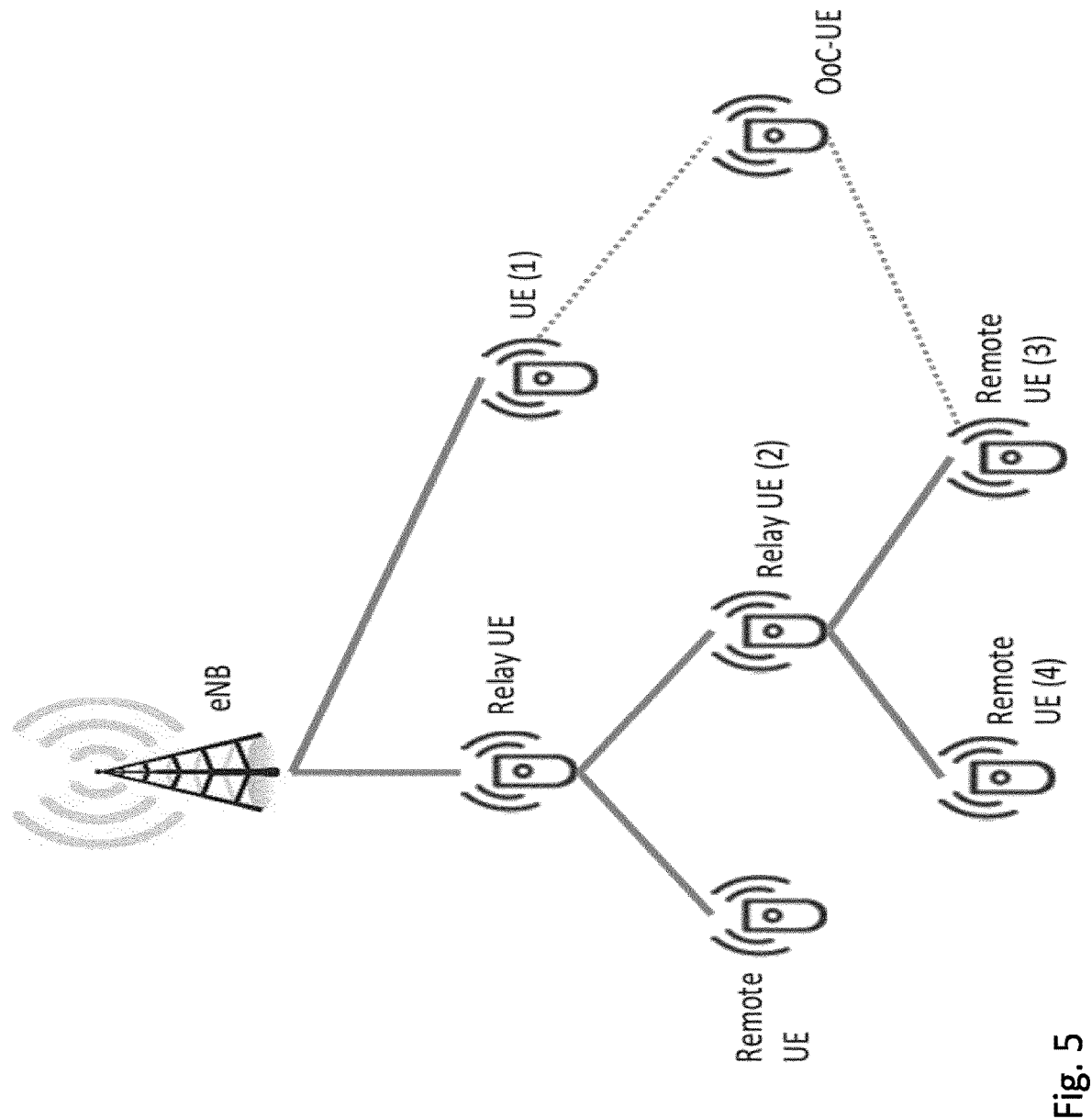
FIG. 5 shows an example multi-hop relaying topology for a moving UE.

FIG. 5 shows an example multi-hop relaying topology for a moving UE. The moving UE may have lost coverage while it was previously connected to a gNB/eNB. The Out-of-Coverage (OoC) UE may initiate a relay discovery process indicating that it requires slice X and Y. In the Figure, UE (1) and UE (3) both receive the discovery message and report the information of OoC-UE along with requested slice X/Y via the gNB to the NRF in the CN. The NRF may determine that slice X relates to Ultra Reliable Low Latency Communication (URLLC) and is best served with a minimal number of hops for lowest latency, while for slice Y high data rate is important.

The NRF determines that UE (1) has fastest connectivity to gNB and sufficient bandwidth to add the additional relayed traffic and satisfy slice Y also. Then, the NRF reports back to UE (1) with slice IDs of X and Y and a preference value 'high'. Also, the NRF may authorize UE (1) to become a relay UE to serve the OoC-UE. The authorizing may be according to a separate message/protocol or combined with the previous step. The CN may also (at the same time) provide credentials to allow the relay UE to access the requested slice(s).

The NRF may report to UE (2) with slice IDs of X and Y and a preference value 'low'. Upon receiving the NRF response, UE(1) may send the discovery response to OoC-UE with slice X/Y and preference 'high'.

UE (3) may receive the NRF response and send the discovery response to OoC-UE with slice X/Y and preference 'low'.

The OoC-UE may receive both discovery responses and may select UE (1) as relay UE; and performs the attachment process to this relay UE. So, UE (1) becomes a relay UE during the process by executing the above procedure. It may optionally do this, when it determines there is a high probability of being selected as relay UE by OoC-UE; due to the 'high' preference value.

It is noted that the above concepts may be mapped to a 5G cellular communication system (5GS). The Network Relay Function (NRF) may be mapped to the Network Slice Selection Function (NSSF) defined in 5G [23.501], or a combination of NSSF and AMF [23.501], but it may also be a new separate network function. Requested slices/slice instances can be mapped to Requested NSSAI [23.501] or temporary/encrypted slice identifiers [33.813] or some other newly defined identifiers. Allowed/supported slices as determined by NRF can be mapped to Allowed NSSAI [23.501]. A slice ID can be mapped to S-NSSAI [23.501] and a set of slice IDs to NSSAI [23.501].

Also, the 'discovery message' may be a discovery type message, or an announcement type message. It may be sent on Sidelink (SL) scheduled resources; or it may be a RACH (Random access channel) type message sent over Sidelink or Uplink (UL) non-scheduled resources. It may also be sent over non-3GPP defined spectrum e.g. Bluetooth. Wi-Fi.

Furthermore, a discovery message sent by requesting UE may optionally include the following. Initially, a UE may send a discovery message to find Relays or potential Relays. The contents of this message should include requested slices in the 'NRF-assisted Relay selection' example and may include requested slices in an 'NF-reconfiguring Relay' example. Also, the discovery message may include either one of a message header or message type indicating that the requesting device requests another device to act as a relay for traffic originating from requester; or a message header or message type indicating that requester is aiming to discover available relay devices.

Also, the discovery message may include some information about the security context UE operates in or wishes to operate in, for example a slice specific security context, an encrypted credential provided by eNB, an encrypted PLMN session key, a security context identifier, a ProSe group ID or service ID and related group/service credential information.

Also, the discovery message may include a reason indicating why a relay is requested, e.g. low battery, out of range of base station, bad signal to base station, relay was recommended by NRF. It may include received signal strength of any messages received from nearby devices, which signal strength data may aid the NRF in Relay selection. Also, it may include power status information of the device, e.g. power source, battery powered, mains powered, or solar power; or current battery level information. Furthermore, it may include standard fields such as transmit signal strength of message, UE identity information. The UE identity information may optionally be a derived or temporary ID for privacy reasons, which the NRF/CN can calculate back to real UE ID if needed.

Also, the discovery message may include distance measurement data or other type of location information, for example speed (which may be absolute speed or relative speed) and/or heading/direction information of the mobile device. The mobile device 110 and/or the relay device may be arranged to perform a distance measurement between the mobile device and a relay device. The connection processor 112 may be arranged to enable a distance measurement and to transfer the measured distance to the network for determining location data of the mobile device and/or the relay device. By receiving one or more distance measurements between the mobile device and relay devices, the NRF is enabled to enhance the selection of the relay devices. In practice, the location data based on receiving the transmissions from mobile devices are not very accurate, e.g. often having a tolerance of 100 m. In contrast, local distance measurements are much more accurate, e.g. often having a tolerance of 1 m. Combining multiple locations of multiple mobile devices with the distances between such located devices may increase the accuracy of the location data.

In order to detect the distance between the mobile device and a relay device, a special mode could be requested on the devices to measure the distance, for example by using Wi-Fi fine-time measurement as specified in IEEE 802.11-2016, or by the MNO authorizing the ProSe function (as specified in [23.303] and [24.334]) on both devices so that they can discover each other using the sidelink D2D communication channel and perform distance measurement or proximity detection, e.g. through PC5 or Wi-Fi Aware ranging.

Possible contents of request message (M) with the requested network slice identifier may be the following. When a requesting UE originates the request message as further sent to NRF, as part of the registration procedure, the message may include a source address or identifier of the mobile device, i.e. the UE itself. The request message may also include QoS requirements, or sets of requested QoS, e.g. a preferred set and an alternative fallback set. It may also contain information about relay UEs in the area that was obtained during the original relay UE discovery process, such as signal strength. Alternatively, this information could be included in the transfer request message (M') by the relay device, or the selected relay devices, for the indirect connection and/or by the base station when forwarding the messages from the UE to the core network. Or alternatively, the NRF may request this information and additional relevant information from the RAN, AMF or other network functions, as described earlier.

When a relay device originates a message based on information received from requesting UE, e.g. during the discovery process or the indirect connection setup, the relay UE may send the message to NRF to indicate that a requesting UE is looking for a relay UE and may include its own source address or identifier in the message.

The network relay entity may be arranged to obtain metadata from the cellular communication system such as received signal strength, signal quality or a distance estimation. Alternatively, or additionally, the transfer request message comprises metadata identifying the current connectivity state, such as manner of network connection, quality of service (QoS) and number of hops, connection stability information and/or frequency bands being used or supported frequency bands of the relay device. The network relay entity (140) may be arranged to determine the network relay information in dependence of the metadata.

The metadata may also be obtained from other sources in the cellular communication system, e.g. sources within the RAN or core network. For example, the number of hops may be obtained from the base station, and the distance estimation may come from a location service in the core network. Also, subscription information from the UDM may be important, e.g. to assess if the relay UE is operated by the same MNO as the remote UE, or to assess if a relay UE is authorized to access a certain slice, or to serve as a relay within a certain slice. UE capability information may come directly from the UE but may also be (partially) provided by the UDM or SCEF. Since the resources of the relay UEs and remote UEs are typically scheduled by the base station, the base station is the device having the knowledge of whether the relay UEs and the remote UEs can be given sufficient sidelink resources to accommodate a certain QoS request from the NRF to accommodate the QoS requirements of a certain network slice.

The NRF may decide whether or not the QoS requirements for a certain network slice can be met. QoS represent important criteria for deciding which relay devices would be capable to serve as relay for a particular slice.

the NRF may use the properties/requirements of the specific slice to determine which relay(s) are preferred to be use. For example, for an IoT slice, it may be preferable to select a relay device that is stationary or that is not an IoT device by itself.

The relay device may optionally include metadata about the requesting UE's message such as RSSI or signal quality or a distance estimation, or the signal quality or distance estimation to another relay device. It may also include information that identifies its current connectivity state, such as one or more of:
  manner of direct/indirect connection;
  QoS information and/or number of hops towards gNB;
  (past) connection stability information;
  buffer sizes;
  current number of connections;
  information about data flows or duty/sleep cycles;
  frequency bands currently being used by the relay UE or supported frequency bands.

The NRF may also obtain such information by interfacing with the RAN/gNB or other core network functions. The RAN/gNB may provide additional information e.g. about the available resources for sidelink communication for each of the relay UEs and remote UE. The NRF, receiving such information, may use it for the decision process. For example, the NRF may use the number of hops with QoS information and/or signal quality information together to determine whether a given relay UE can satisfy the slice requested by UE. E.g. if it is a slice that offers low latency communication, a relay UE with high number of hops is not preferred. The NRF may even disallow the use of the slice if the required latency cannot be achieved due to the number of hops and may indicate this to the originating UE.

Also, the message to NRF may optionally include UE capabilities of the relay UE. The UE's capabilities information may include:
  information about the relay functionality, which may, e.g. include specific constraint information under what circumstances the UE is capable of Relaying;
  Radio Rx/Tx speed category, or 3GPP UE class/level;
  Radio Frequency bands being used or supported;
  Processor performance class and/or current load;
  Mobility information: fixed (e.g. a roadside V2X node), or possibly mobile (e.g. a mobile phone or worn sensor). Also, location/heading information may be included, e.g. in V2X cases;
  Power source, battery level or expected device operational duration information (which can be used in making optimal Relay decisions);
  Identifications of specific relay-related security contexts that the device already supports;
  Preferences for relaying certain application types, application IDs, or group IDs;
  Support for IP traffic and certain packet sizes.
  Support for certain services, such as location support.
  What type of relay the relay device is capable of supporting, e.g. layer-2 relay (on PDCP level) or layer-3 relay (on IP level). The NRF may use the above capabilities information to determine an optimal selection of relay UEs given the properties/requirements of the specific slice, or slices, that are requested. For example:
  For an IoT slice: a non-mobile, mains-powered node with ample resources and high-speed connectivity may be preferred as a relay UE above a battery-powered, mobile, low-resource IoT sensor;

For an IoT slice: using a relay UE that is itself not an IoT device may be preferred above a direct network connection for the IoT device, in order to save battery;

For a V2X slice: using a relay UE that is itself in the V2X slice may be preferred;

For a V2X slice: using a relay UE that is moving into the same direction as the requesting UE may be preferred. Even if the relay UE is not in the same V2X slice;

The NRF may use currently used frequency bands information of relay UEs in the selection process. When the NF obtains information about currently used frequency band(s) of relay UEs, e.g. from the message receive from a relay UE, or from gNB, or other means, the NRF may use this information in the selection to determine which relay UE cannot serve a specific slice. This happens e.g. if a slice is associated to using specific dedicated frequency band(s), such as a 'V2X' slice using V2X-reserved frequency band. Some candidate relay UEs may not be operating in this band currently so these may not be suitable to perform any relaying role for this slice. The NRF may exclude these candidate relay UEs from the selection process or may still include them but as candidates with low preference. As a fallback solution such relay UE could serve the 'V2X' slice via a different band. The same holds for NB-IoT/LTE-M devices, which may operate in guard bands that may not be supported by e.g. mobile phones that may be candidate relay UEs.

The requesting UE may indicate a security context or key to use for subsequent attachment to a relay UE. The security context for relaying may be linked to the security context for a slice. In ProSe, a remote UE and relay UE need to possess a shared security context (i.e. key material) to be able to establish a D2D connection to use for relaying purposes. In existing specifications, the security context is preconfigured at application level which limits the usefulness of the relay function to only devices that have the same application context. In an enhancement, arbitrary yet unknown UEs may be supported as relays. The following may apply.

The requesting UE may indicate in its discovery message a security context, or key, C which it supports. This may be a slice-specific security context, or a more general one that is valid for multiple slices, or e.g. a security context for a (third party) defined group of devices, e.g. all medical devices within a hospital or a ProSe application group. The context information may also include a random ID or partial key that can be used by NRF/CN later to derive the complete key to use.

The relay UE may send information about security context C to the NRF, such that NRF is able to retrieve information related to that security context from the CN.

The NRF may include information based on above, such as key material or credentials, in the response message sent back to Relay UE.

The relay UE may subsequently use the security information to accept a secure relay-request from requesting UE, performed in a secure manner, e.g. to protect against eavesdropping, replay, packet injection etc. during the relay establishment protocol.

It is noted that using the above-mentioned random ID or partial key, the potential impact of malicious relay UEs storing and sharing the security material is reduced because the security material will only be valid for a temporary period.

The CN may detect that a UE went OoC. Subsequently, the CN may request one or more UEs that it calculates are likely to be nearby the OoC-UE to start broadcasting 'Relay available' messages to aid the OoC-UE to quickly discover a suitable relay UE. In this case the CN may involve the NRF to determine, based on the previous slice information of OoC-UE, which Relay UEs are most suitable to be made available in this manner.

Furthermore, the NRF may authorize and instruct selected relay UE candidate(s) to activate their relay functionality in case they were not acting as relay yet. This assures fast connection to the chosen relay UE later on, since it is already activated and has the network permission/authorization to act as relay UE. Also, after the NRF has determined an optimal relay device for the requesting UE, it may notify the gNB of decision and the expected slice requirements from the requesting UE. This allows gNB to start scheduling proper resources to support the requesting UE. This has the benefit that the proper resources for requesting UE operation in its desired slice(s) are already prepared and scheduled at the gNB even before the UE is fully attached to that relay UE and the CN. This shortens any temporary QoS/bandwidth issue during relay transition or transition from direct network connection to a relayed connection.

Furthermore, if one of the requested slices is an 'emergency' type slice, this may be given priority in the selection process, or it may receive special treatment from potential candidate relay UEs, e.g. automatically enable them to act as relay UEs, and allow the emergency connection to be set up to any of the discovered candidate relay UEs. Alternatively, the emergency slice may automatically be included in the discovery response by candidate relay UEs. This may also be done for relay UEs that are participating in slices with known restricted usage, such as Public Safety. These are unlikely to act as relay UE for any other device, and hence may include the Public Safety slice automatically in its response and may not even contact the NF in the process.

Furthermore, the discovery message or 'Request Relay' message may include an identifier that indicates a class of device or class of application that the UE is related to. For example, medical devices could be a separate class as well as emergency services devices. An application class may be 'IoT applications of the local government'. This identifier may help a UE to make a decision as to whether or not it will act as relay UE for a device indicating this particular identifier. This allows potential relay devices to configure for which purposes they would like to help in a relay role, for example medical applications may be seen as more important to users than purely commercial applications. Also, not all relay devices may be acceptable to be used to relay for medical or safety related data, e.g. in order to comply with regulatory rules on medical data processing and transport. To prevent fraud (spoofing of identifier), a cryptographic certificate, signature or proof element may be added with communications such that the UE can prove that it is part of the claimed application or device class.

It may happen that a UE moves out of range, but can still receive, though weakly, the synchronization information and/or other broadcast messages from eNB but is not able to send back due to long distance, signal obstruction or lack of battery power or transmitter output power, i.e. the eNB will not hear the device. In such case, the eNB may assume that the UE might be still listening and proactively transmit certain instructions to the UE. For example, the network may instruct such UE to start requesting for a relay, possibly including channel information and timing information. Or it could transmit to the UE what are best times to transmit a 'Relay Request', e.g. as part of a discovery message.

If a UE just lost contact to eNB, it may either use (previous) synchronization with base station as a basis for its local clock, or alternatively detect a synchronization signal from devices operating in discovery mode. If contact was just lost, the eNB may provide synchronization information given to various candidate relay UEs in vicinity including information when the UE was last seen, and/or further including possible estimations of clock drift and/or timing margins to adjust their listen time windows to ensure maximum probability to hear the expected transmission from the UE. Alternatively, the candidate relay devices may receive information from eNB about previous scheduled resources for the UE on Sidelink or Uplink channels. The relay devices may use this to listen to the 'Relay Request' message at the right time/frequency.

If the UE is already connected to a slice via a relay connection and detects insufficient bandwidth/QoS is available for its communication as required/expected for the slice it is currently operating with, it could initiate a request to one of the other candidate relay UEs it has discovered previously based on the preference information indicated by the NRF. Alternatively, it could initiate a new discovery process, or send a request directly to the NRF to provide (up to date) information about which other relay UE to select to meet the QoS properties of the slice, in which case the NRF may be involved in initiating a discovery process amongst relay UEs and gNBs in a certain geographic area near the UE.

Similar to above, the eNB/network may detect that insufficient bandwidth or QoS is available and proactively launch a process to find a suitable relay. The UE is then first instructed to send the 'Request Relay' message and secondly instructed to connect to a specific Relay or pick from a set of Relays.

It is noted that a user or operator of the UE offering a relay function to others may be rewarded or compensated for this effort. The compensation may be in various forms like payment, adding usage credits to its cellular subscription bundle, or specific service benefits, e.g. being able to make use of other relay devices. Some charging functions may need to be extended for this. This may include specific charging functions for acting as relay UEs for certain slice of which the relay UE may or may not have a subscription to operate in, e.g. private slices.

In an additional detailed example, a set of Connection Context Identifiers (CCIs) is defined by the mobile network, whereby each CCI is mapped to a combination of PDU session parameters [23.501], such as PLMN ID (+NID/CAG ID), S-NSSAI, DNN, PDU session type, etc., and possibly some additional parameters, such as group IDs, QoS requirements, frequencies, security context, etc. that Remote UEs may wish to use for connecting to the core network via a Relay UE. Some of these parameters may impose restrictions on whether a Relay UE is authorized and capable of acting as a relay for the Remote UE.

Since a lot of the above-mentioned information is privacy sensitive and could lead to tracking of Remote UEs and expose deployment information of the operator (e.g. which slices/NPNs are supported by the core network), it may be preferable that this information be stored and used as much as possible in the core network, and not be provisioned as such to Relay UEs, which may be considered untrusted end-user devices. Storing, using and processing this information inside the core network also makes it possible to deal with the dynamic aspects of using slices, e.g. in order to meet the QoS requirements defined by the service level agreement for the network slice. Even though Remote UEs are also untrusted end-user devices, some of this information may need to be provisioned to the Remote UE, since Remote UE's are likely out of coverage when they need to discover and make use of a Relay UE to reach the network. However, for a Remote UE exposing some of this information is less problematic because the Remote UE can be provisioned solely with the PDU session parameters that are enabled by the Remote UE's subscription. For Relay UEs this is different, since it could potentially act as a relay for a diverse set of Remote UEs (which may even include inbound roaming Remote UEs). The CCIs that may be used by the Remote UE may only be known to the operator of the Remote UE, and hence may not be known to the Relay UE at the time of discovery, but they may be retrieved from the home operator of the Remote UE by the network operator of the Relay UE (i.e. the visiting network).

Furthermore, given the potential number of slices and NPNs that may be supported by the 5GC, the number of possible combinations of the aforementioned parameters may potentially be quite high and may require quite a large number of CCIs.

In order to have to provision as few CCIs to the Relay UE as possible, and also to make sure a Remote UE which may use potentially unknown or outdated CCIs can still discover a Relay UE and request access to the network via the Relay UE, a solution is to use one or more Generic CCIs. Whereas CCIs are bound to a particular set of PDU session parameters and may not be known to the relay UE, a Generic CCI is an identifier (e.g. predefined value with possibly a longer lifetime and possibly commonly used for different PLMNs) that may be used as a 'wildcard' to request access to any set of PDU session parameters for one or more PLMNs. The Generic CCI value may be mapped to or indicate some wildcard values (e.g. such as asterisk) or other regular expressions. The Generic CCI value may be associated to an initial security context by which the remote UE and relay UE may prove that they are authorized to issue a discovery or connection setup request through which the remote UE can request access to a particular slice/NPN and/or to use a particular set of PDU session parameters, via the relay UE. The Generic CCI may also be associated with the default network slice for one or more PLMNs. Alternatively, the Generic CCI may be associated to an application context or (V2X) Application ID [23.287]. It is advantageous that at least one Generic CCI is provisioned in both the remote UE and relay UE. Using a Generic CCI may also make it easier to support Model A discovery (i.e. broadcasting 'I'm here') because these messages can remain small, and normally does not contain an extensive list of CCIs, which may regularly need to be changed. It also makes it easier to discover all the available options that are available for the remote UE by using a single identifier in the request message, instead of having to include a potentially large list of identifiers. The Generic CCI may also be used as a trigger in the remote UE and the relay UE to include a specific CCI as part of a discovery message or connection request. Alternatively, a separate message could be defined to send a Generic CCI, but the benefit of using a Generic CCI is that the same discovery and PC5 connection setup messages can be reused.

Figure 7:
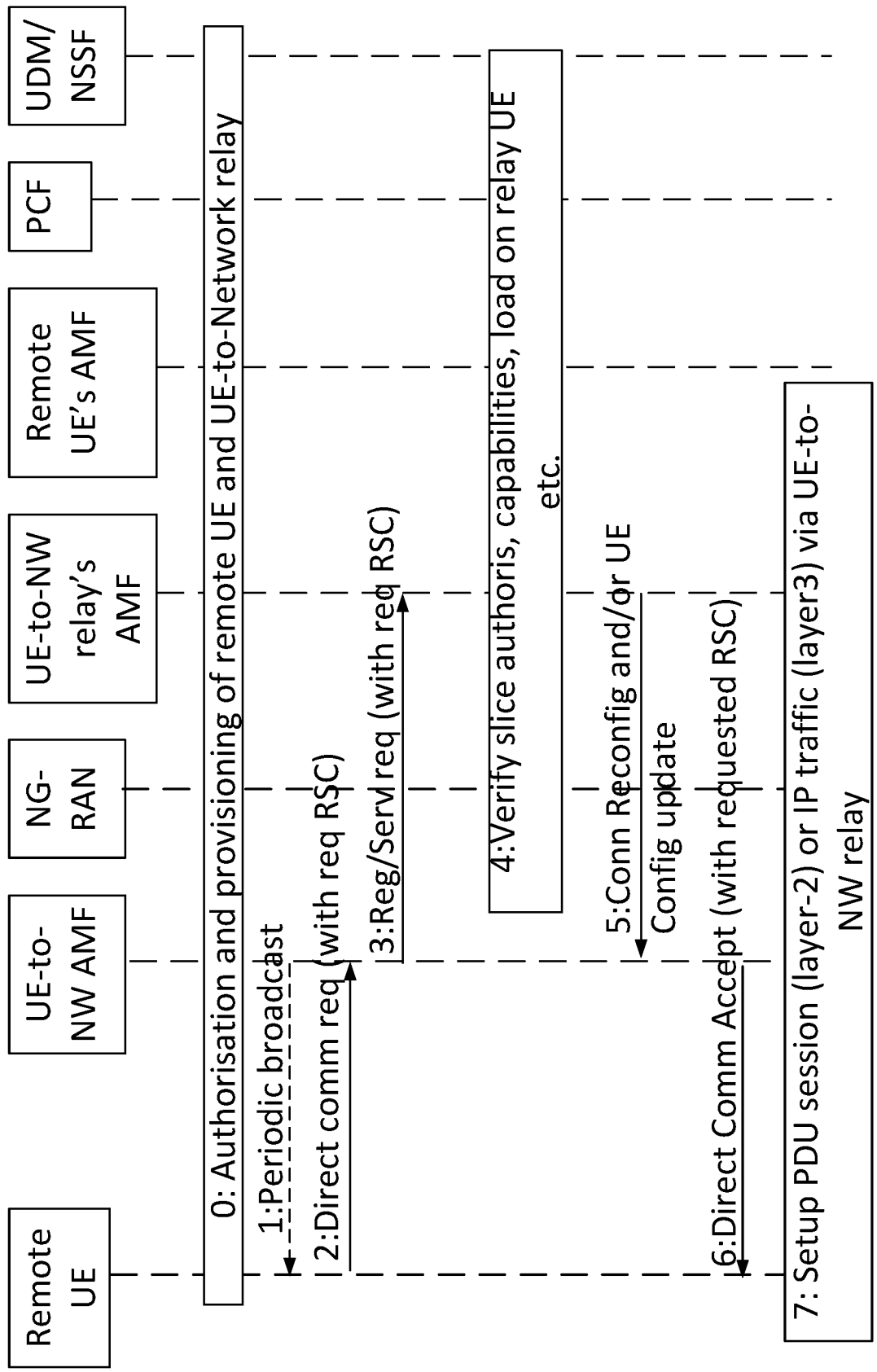
FIG. 7 shows an example of an NRF-assisted relay selection sequence, according to an embodiment.

The detailed procedure is described below and illustrated in FIG. 7.

Step 0: Before the discovery of the Relay UE can be performed, the following information should be provisioned in the Remote UE and Relay UE beforehand, e.g. by using a UE Configuration update procedure [23.501], e.g. initiated from the AMF or PCF:

For the Remote UE:
   One or more CCIs which the Remote UE is authorized to use, including a flag indicating for each CCI if it is a generic CCI or a specific CCI.
   The mapping between each CCI that the Remote UE is authorized to use and the default Destination Layer-2 ID(s) for initial signaling to establish a PC5 unicast connection [23.287].
   The mapping between each CCI and a set of PDU session parameter values, which may include amongst others one or more of:
   PLMN ID
   NID/CAG ID
   S-NSSAI
   DNN
   PDU Session Type
   For Generic CCIs, the set may be empty or a small subset of parameters, may indicate some wildcard values (e.g. such as asterisk, regular expressions), or may contain special pre-defined values e.g. to denote the default slice.
   (Optional) The mapping between each CCI and a security context (e.g. set of credentials).
   A policy to restrict the Remote UE's PDU sessions to the PDU session parameter values corresponding to a requested CCI.
For the Relay UE:
   One or more CCIs which the Relay UE is authorized to expose and react upon during discovery, including a flag indicating for each CCI if it is a generic CCI or a specific CCI. This should be a small subset of all the CCIs that the Relay UE may be able to handle and be configured for after consulting the Relay UE's AMF, in order to reduce the exposure of potentially privacy sensitive information.
   The mapping between each of the CCI for which the Relay UE is authorized to expose and react upon during discovery, and the default Destination Layer-2 ID(s) for initial signalling to establish PC5 unicast connection [23.287].
   (Optional) The mapping between each CCI and a security context (e.g. set of credentials).
   (Optional) default destination layer-2 ID for broadcast communication over PC5 [23.287].
In addition, the AMF of the Relay UE should be provided with the following information (either beforehand, or the AMF can consult the respective network functions, such as PCF, NSSF, UDM when the AMF receives the transfer request message (M)):
   An extensive list of CCIs which the Relay UE may be able to handle and get authorized for, including a flag indicating for each CCI if it is a generic CCI or a specific CCI. Since the list of CCIs for the AMF may not always be updated at the same time as for the remote UEs (and relay UEs), which may be out-of-coverage for a while, the AMF should also keep a history of old CCI values.
   The mapping between each CCI and a set of PDU session parameter values, which may include amongst others one or more of:
   PLMN ID
   NID/CAG ID
   S-NSSAI
   DNN
   PDU Session Type
   For Generic CCIs, the set may be empty or a small subset of parameters, may indicate some wildcard values (e.g. such as asterisk, regular expressions), or may contain special pre-defined values e.g. to denote the default slice.

The PCF in the HPLMN of the UE that needs to be provisioned to be a Remote UE or Relay UE may interact with PCF of other PLMNs (e.g. possible Visiting PLMN of roaming partners) to perform CCI allocation and management.

Step 1: The Relay UE may periodically broadcast one or more CCIs for which the Relay UE is configured using a (V2X) Broadcast Message over PC5. In order to keep the broadcast message small, the set of CCIs is preferably kept very small and preferably include a generic CCI.

Step 2: The Remote UE can initiate discovery to find a Relay UE by sending a Direct Communication Request over PC5 as specified in TS 23.287 or similar message with the requested CCI being used as a (V2X) service/application identifier. If the requested CCI is a generic CCI, the Direct Communication Request may include an additional CCI, which is indicative of a set of PDU parameters that the Remote UE wishes to use. The Direct Communication Request uses the default Destination Layer-2 ID configured for the requested CCI (or if known the Layer-2 ID of the target Relay UE), and in case of V2X is typically sent over a Sidelink shared broadcast/multicast channel and can be received by multiple Relay UEs. This Direct Communication Request message corresponds to the request message (M) referred to elsewhere in this document.

Step 3: One or more Relay UEs may receive the Direct Communication Request over PC5. If the CCI in the Direct Communication Request matches a CCI that is known to the Relay UE, the Relay UE sends a Registration Request [23.501] or Service Request [23.501] or a dedicated request message to the Relay UE's serving AMF (not only in CM_IDLE state, but also in CM_CONNECTED state). The Registration/Service/dedicated request message includes the requested CCI, and if the Relay UE has received an additional CCI in the Direct Communication Request in step 2, then the additional CCI will be included in the Registration/Service/dedicated request message. Preferably the additional CCI is included instead of the generic CCI. The Relay UE may (re-)use an existing PDU session that it has established beforehand to connect to the Relay UE's AMF to send the Registration/Service/dedicated Request message. This Registration/Service/dedicated request message corresponds to the transfer request message (M') as used in other parts of this document.

Step 4: The Relay UE's serving AMF will receive the transfer request message (M') and verify if the Relay UE is authorized to serve as Relay UE for the given CCI, and in particular the associated network slice (indicated by S-NSSAI) and/or NPN (indicated by PLMN ID+NID/CAG ID) in the mapping table between CCIs and PDU session parameters, and also verifies if the Relay UE is capable to meet the requirement associated with the CCI's PDU parameters, in particular if it is capable and authorized to act as relay for the associated network slice (indicated by S-NSSAI in the mapping table) and/or NPN (indicated by PLMN ID+NID/CAG ID), and whether it can meet the QoS requirement of the particular slice/NPN. In order to perform the verification, the AMF may request information from other network functions, such as NSSF (about allowed network slices), RAN (about capabilities and load of the Relay UE, congestion, and signal quality), SMF (about ongoing PDU sessions and their QoS), UDM (for subscription related information), PCF (for policy information, PDU session configuration and QoS related information), NWDAF (for combined measurement information, analytics data, and historical data), ProSe function, application function, etc. In case the relay UE sends a Generic CCI to the AMF and no additional value is supplied in the transfer request message (M'), then the AMF will decide for each set of combinations of PDU session parameters whether or not these can be served by the relay UE. In case the CCI value is not part of the mapping to PDU session parameters in the AMF, the AMF may search its history of previous CCI values or may contact the AMF (or database) of 5G networks of other network operators.

Step 5: If it is decided that Relay UE can act as relay for the given CCI and its associated network slice(s) and/or NPN(s) and other PDU session parameters, then the AMF will send a RRC Connection Reconfiguration message and/or may send a UE Configuration Update and/or dedicated message to the Relay UE. This Connection Reconfiguration/UE Configuration Update/dedicated message may include information to reconfigure an existing PDU session between the relay device and the network to accommodate relaying network traffic for a particular slice (e.g. change the DNN, connect to different User Plane Function), update the UE configuration (possibly including different S-NSSAI information, different policy information, different credentials) and issue a reconnect (which may e.g. lead to selecting a different Access and Mobility Management Function (AMF) to serve the network slice), This Connection Reconfiguration/UE Configuration Update/dedicated message may include instructions to initiate additional PDU sessions with the network in case the Relay UE is already serving other Remote UEs. This Connection Reconfiguration/UE Configuration Update/dedicated message may also include instructions to connect to a different PLMN/NPN, and may include instructions for the radio access network, e.g. to send an updated list of Allowed NSSAI values for the relay UE and/or remote UE, or e.g. instructions to camp on specific cells to access an NPN (identified by CAG ID in case of a public network operated NPN or NID (together with PLMN ID information) in case of a standalone NPN).

In particular, the AMF may configure a PDU session of the relay device to connect to a cellular base station which is configured (within the Radio Access Network. e.g. based on an NGAP message [38.413] from the AMF to the Radio Access Network) with the CAG ID/NID being part of the Allowed CAG/NID list in the Mobility Restriction information and/or which is configured as a CAG cell which may broadcast the CAG ID/NID within a system information block and/or for which the Radio Access Network is configured to report to the core network (e.g. within an NGAP message [38.413] to the AMF) the CAG ID/NID denoting the non-public network if the relay device connects directly or the mobile device connects indirectly via the relay device to the cellular base station configured as a CAG cell and/or for which the CAG ID/NID is part of the Allowed CAG/NID list in the Mobility Restriction information.

If it is decided that Relay UE cannot act as relay for the given CCI and its associated network slice(s) and/or NPN(s) and other PDU session parameters, then the AMF will include a 'Relay rejected' error code for the requested CCI as part of this Connection Reconfiguration/UE Configuration Update/dedicated message. This Connection Reconfiguration/UE Configuration Update/dedicated message may also include information about other CCIs (e.g. a list of CCIs for the possible combinations of PDU sessions parameters the relay UE is able to relay in case only a Generic CCI is sent to the AMF) and information about other Relay UEs in vicinity. This Connection Reconfiguration/UE Configuration Update/dedicated message corresponds to the transfer response message (N') as used in other parts of this document.

Step 6: If relaying for the given CCI is not rejected by the Relay UE's serving AMF in step 4/5, the Relay UE performs the PC5 unicast link security procedure [23.287] and sends a Direct Communication Accept message [23.287] to the Remote UE that includes the given CCI as (V2X) service/application identifier. The Direct Communication Accept message may include some QoS information, IP config information (e.g. for layer-3 relaying), and possibly some additional information about the relay. The message may also include information about other CCIs and information about other Relay UEs in vicinity. If relaying for the given CCI is rejected by the Relay UE's serving AMF in step 4/5, then the Relay UE may either not send any response to the Remote UE, or may send a Direct Communication Reject message [24.587]. This could be used to send other CCIs and information about other Relay UEs in vicinity to the Remote UE. This Direct Communication Accept/Reject message corresponds to the response message (N) as used in other parts of this document.

Step 7: After it has successfully concluded steps 2-6, the Remote UE can start the indirect communication to the core network by using the PC5 connection that was set up between the Remote UE and the Relay UE using the Direct Communication Request/Accept procedure, whereby the Relay UE will relay the received traffic from the Remote UE to the network. In case of layer-2 relay (i.e. forwarding PDCP messages), the Remote UE can initiate/resume a PDU session by sending a Registration/Service Request to the network, whereby it needs to restrict the PDU parameters that it uses (e.g. in the Initial Registration) to the configured PDU parameters related to the CCI as received in the Direct Communication Accept message. In case of layer-3 relay (i.e. forwarding IP packets), the Remote UE will receive IP address information from the Relay UE that it can use for transmitting IP traffic to the Relay UE, which will then forward it to the correct destination based on the configured PDU parameters related to the CCI. If the Remote UE wants/needs to establish a PDU session with different PDU parameters (e.g. different S-NSSAI or different CAG ID/NID), the Remote UE shall repeat steps 2-7. In case of layer 2 relaying, each time the Remote UE sets up a new PDU session, the AMF should verify if the PDU parameters used correspond to a CCI that was received in step 4. If not, the AMF may reject the PDU session or send a RRC Reconfiguration or UE Configuration Update message to the Remote UE via the indirect connection.

FIG. 6a shows a computer readable medium 1000 having a writable part 1010 comprising a computer program 1020, the computer program 1020 comprising instructions for causing a processor system to perform one or more of the above methods and processes in the system as described with reference to FIGS. 1-4. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

FIG. 6b shows in a schematic representation of a processor system 1100 according to an embodiment of the devices or methods as described with reference to FIGS. 1-4. The processor system may comprise a circuit 1110, for example one or more integrated circuits. The architecture of the circuit 1110 is schematically shown in the Figure. Circuit 1110 comprises a processing unit 1120, e.g. a CPU, for running computer program components to execute a method according to an embodiment and/or implement its modules or units. Circuit 1110 comprises a memory 1122 for storing programming code, data, etc. Part of memory 1122 may be read-only. Part of memory 1122 may be non-volatile. Circuit 1110 may comprise a communication element 1126, e.g. an antenna, a transceiver, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

In an embodiment, there is a system consisting of a device UE0 operating as cellular communication User Equipment and further being able to operate as a remote UE, a device UE1 operating as cellular communication User Equipment and further being able to relay network traffic from UE0 to/from a cellular communication system CCS capable of supporting relay operation (typically through a logical function called Network Relay Function (NRF) which may be a separate network function in the Core Network or the Radio Access Network of the CCS or may be combined/integrated with any core network function (such as AMF, PCF, SMF, . . . ), whereby:
  a. Device UE0 sends a message to a relay device UE1, the message including an (optionally encrypted) Relay Service Code RSC1, the Relay Service Code identifying or associated with a set of PDU session related attributes (such as PLMN ID (+NID/CAG ID), (temporary/encrypted) S-NSSAI, (temporary/encrypted) DNN, PDU session type, group IDs, QoS requirements (such as 5QI), frequencies, security context, etc), and further containing (e.g. as part of a secured envelope V) an (optionally encrypted) identifier of UE0, and an (optionally encrypted) identifier of UE1;
  b. Relay device UE1 sends a message containing RSC1 and, optionally, V or one or more of the (encrypted) identifiers (i.e. Relay Service Code, identifier of UE0, identifier of UE1) received from Device UE0 to the cellular communication system CCS;
  c. Relay device UE1 receives a message containing an encrypted Relay Service Code RSC2 from CCS, whereby RSC2 is encrypted using credentials that are shared between Device UE0 and CCS, but not shared with Device UE1, whereby preferably the different Relay Service Code (RSC2') is selected from a set of spare Relay Service Codes available in the relay device
  d. Relay device UE1 sends a message to Device UE0 containing the encrypted Relay Service Code RSC2.
  e. Device UE0 uses RSC2 instead of RSC1 in subsequent messages for discovery and/or connection setup to relay devices.

The benefit of doing so, is that an eavesdropper (including relay device UE1, and other relay devices and remote devices) cannot track device UE0 using RSC1 after it disconnects, even if the discovery and connection setup messages itself are unencrypted and not authenticated and the Relay Service Codes are sent in the clear.

Figure 8:
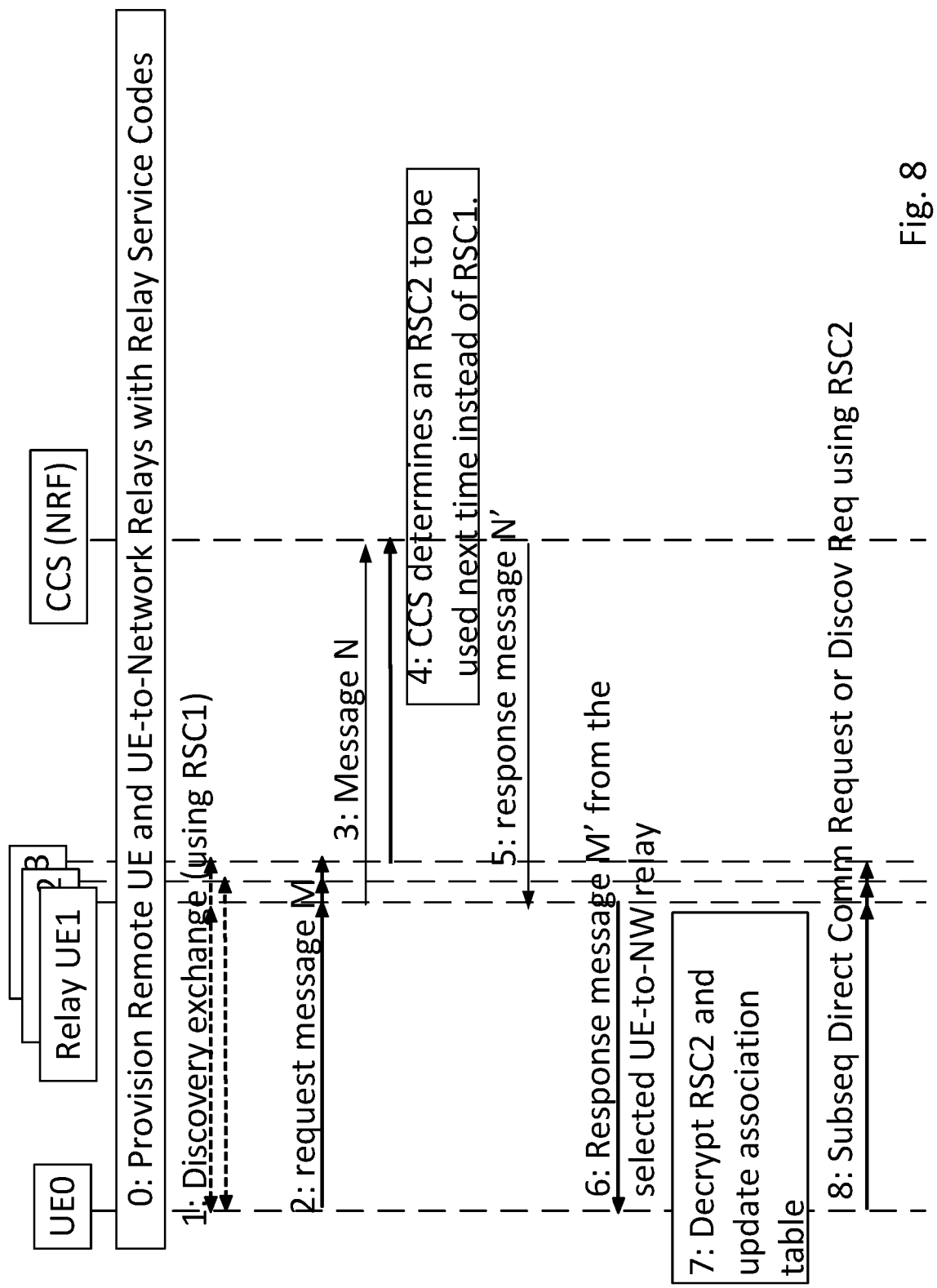
FIG. 8 shows an example of a Relay Service Code update sequence, according to an embodiment.

It also does this in an efficient manner, as only the RSC that has been used by a remote UE (i.e. device UE0) needs to be updated, and not all RSC values in all other remote UEs and/or relay UEs. And it may also work if a remote UE is out of coverage of the network's base stations. Also, advantageously, the procedure may be combined with a procedure to verify the authorization of the remote UE and relay UE by the network for setting up a relay connection for the particular relay service code and/or for setting up the PDU session with the PDU session parameters associated with the relay service code, and/or may be combined with the procedure to request the security keys for setting up such relay connection from the network, and/or may be combined with a procedure in which (e.g. in case of Layer-3 relays) the relay device UE1 fetches or is provided with a set of privacy sensitive PDU session related parameters (e.g. slice identifier/NSSAI, DNN) related to RSC1 for setting up a relay connection to the network, and in this way enable faster and more secure connection setup A detailed procedure is described below and illustrated in FIG. 8.

Step 0: Device UE0 (i.e. the Remote UE) is provisioned by the CCS, in particular the Network Relay Function (NRF) of the CCS, with a set of Relay Service Codes identifying or associated with one or more PDU session related parameters (e.g. S-NSSAI, DNN, etc.). This set may be limited to only Relay Service Codes that are associated to PDU session parameters that UE0 can use based on subscription information in the CCS. Relay device UE1 (and other relay UEs) get provisioned with a set of Relay Service Codes which UE1 is allowed to use/respond to during discover, but may or may not be given the respective associated PDU session related parameter information. Preferably, several of the Relay Service Codes provisioned to the Relay Device UE1 are not yet assigned in these initial steps to any Remote UE, and/or are not yet assigned (in the network or any remote UE or other relay UE) to a set of PDU session parameters, and hence are considered to be spare (i.e. extra/unassigned) relay service codes. During step 0, the relay UEs may also be provisioned with a policy that describes the types of connections it supports, and a long-term public/private key pair or other security material (e.g. as described in steps 2 and 5 below), or a temporary ID or randomization function for generating temporary IDs that the remote UE (or relay UE) should use in subsequent messages for setting up a relay connection via the relay UE. Advantageously, the policy and/or the PDU session parameters may be signed together with the related long term public key by the Core Network.

All other data (Relay Service Codes, PDU session parameters, policies, security material) may also be signed by the Core Network.

Step 1: This is an optional step in which device UE0 and relay device UE1 may exchange some discovery information (over PC5), such as the Relay Service Codes it supports and identity information of the relay device (as described in the steps below) enabling device UE0 to select relay device UE1 to be the relay device which device UE0 (the remote UE) wants to use to send and receive messages to/from CCS. The discovery exchange may use Relay Service Code RSC1. For security and privacy reasons the discovery information such as the Relay Service Code should be protected (e.g. by encrypting it with e.g. a preconfigured discovery key, and which can be decrypted preferably only by relay devices that have been authorized to support the relay service code requested by the remote UE). For further privacy protection, including to avoid tracing the Remote UE during discovery by those UE-to-Network relays, the Remote UE should frequently change its layer-2 identifier used for discovery solicitation messages (e.g. "Model B"), preferably using a different layer-2 identifier for each subsequent solicitation message. The Remote UE should also randomly pause between sending two subsequent messages (e.g. by skipping a random number of allocated/scheduled resources for sidelink discovery) to avoid any pattern detection, and if possible also interchange with soliciting other Relay Service Codes that the Remote UE supports or by soliciting using fake/random Relay Service Codes that are not supported by the Remote UE or by frequently changing the keys to encrypt/integrity protect the payload of the discovery messages.

In the discovery message the relay device may send a nonce and its public-key. Further, the relay device may also send, its policies, and/or what type of connections it supports, and/or which PDU session parameter values or combinations it may accept. The relay device may include a signature to verify the sent information is genuine. For efficiency, this could also be sent to a remote UE only under request.

A remote UE may verify the received information (e.g. the policy and the related public key) in the previous step (e.g. by verifying if it was properly signed by the core network), and conclude that the relay UE supports its requirements (based on the received policy, relay service code, PDU session parameters/connection types), the remote UE may proceed with the following steps, and may use the received public-key, to encrypt the PDU parameters or the Relay Service Code it likes to request to the Relay UE.

Step 2: Device UE0 sends a request message M (e.g. Direct Communication Request message or Discovery Request over PC5) that includes Relay Service Code RSC1 and may also include a payload/envelope V containing a layer-2 identifier or other identifier (e.g. GPSI/TMSI/IMSI/SUPI/SUCI/GUTI or signature/hash/security credential associated with relay device UE1 or indicative of the identity of relay device UE1) received from relay device UE1 during step 1 or through other means (e.g. an identifier received from/generated by an application running on device UE0, or a temporary ID received in step 0).

The payload/envelope V may also contain a (unique) identifier of UE0 (e.g. GPSI/TMSI/IMSI/SUPI/SUCI/GUTI, or a temporary ID received in step 0). The Relay Service Code and/or payload/envelope V may be encrypted by a key derived from UE0's USIM. Alternatively, the Relay Service Code, the identifier of device UE0 and relay device UE1 are encrypted individually and included as individual parameters/fields of message M, or are combined (e.g. some bits of the identifier of UE0 concatenated with some bits of the identifier of UE1, or hash of each of these identifiers are combined) before being encrypted and included in message M. Note that a SUCI stands for Subscription Concealed Identifier (SUCI) and is a privacy preserving identifier containing the concealed SUPI. The UE generates a SUCI using a ECIES-based protection scheme with the public key of the Home Network that was securely provisioned to the USIM during the USIM registration, and hence cannot be decrypted by the relay device UE1 to retrieve the SUPI, since it does not have the corresponding private key for decrypting. Even though the value of the SUCI also includes a Home Network Identifier (e.g. Mobile Country Code/Mobile Network Code) in plain text it is considered to be an encrypted identifier in the context of this description, i.e. an encryption scheme does not necessarily need to protect all bits of the identifier. The identifiers may also be sent unencrypted in the same message whereby the message may include a Message Authentication Code/hash/nonce/digital signature for integrity protection (e.g. generated using a cryptographic hash function such as HMAC) that may need to be forwarded to the network for further verification. It should be noted that the Message Authentication Code may also cover encrypted values and identifiers to make sure the encrypted values and identifiers have not been tampered with. All these different alternative ways of combining information from UE0 and UE1 represent a protected/securely signed indicator that device UE0 acting as remote UE has selected relay device UE1 for setting up the indirect/relayed connected between UE0 and CCS. The encryption method or (cryptographic) hash function may take additional values as seed, such as a counter to prevent replay attacks or other information received or derived from earlier messages received from relay device UE1 (e.g. PHY level information such as time of flight of the discovery message received in step 1). These values may also be added to the (encrypted) payload/envelope. The key used for encryption may be a key derived from UE0's USIM, a public key (e.g. provided by the CCS or relay UE) or key material received from the relay UE during (restricted) discovery, or a pre-shared key (e.g. the remote UE may have been pre-provisioned (e.g. together with other information in step 0) with some key material to use during such procedure (e.g. a root relay connection key, such as ProSe Relay User Key (PRUK) as defined in TS 33.303 or e.g. the long term credentials in TS 33.536 that form the root of the security of the PC5 unicast link), whereby different key material may be used. depending on whether the remote UE is in-coverage of an gNB or out of coverage) or with some key material to use for a particular relay UE or to use in a certain tracking area). The key used for encryption may also be the same key as identified by the Home Network Public Key Identifier of the SUCI of the Remote UE.

By combining an (encrypted) identifier of UE0, e.g. SUCI/5G-GUTI together with the (encrypted) identifier of UE1 as selected by UE0 (e.g. combined together in a secure envelope and/or by including a message authentication code as described earlier), it can be ensured that only the relay UE that UE0 has selected can properly take part in this procedure (i.e. it represents a protected/securely signed indicator that device UE0 acting as remote UE has selected relay device UE1 for setting up the indirect/relayed connected between UE0 and CCS), and can prevent malicious UEs from tracing UE0 based on knowledge it may have acquired about relay service codes by overhearing the traffic, from manipulating/replaying/interrupting the procedure, and from potentially gaining access to privacy sensitive information about UE0 or UE1. This even works if the messages itself are unencrypted and not authenticated and the Relay Service Code is sent in the clear.

Request message M may be received by multiple relay devices. For additional privacy protection, the Remote UE should select a different layer-2 ID (e.g. by selecting a new random source layer-2 IS) for the Direct Communication Request from the layer-2 ID that was used in previous model B discovery solicitation messages. Indeed, preferably, device UE0 should also use a different layer-2 identifier each time it sends a request message (M), or at least different from the previous request message (M).

Step 3: After receiving request message M, Relay device UE1 sends a message N (e.g. Service Request, Registration Request, PDU session establishment request, Relay Request Report or other RRC or NAS message, or by forwarding the Direct Connection Request), also described as transfer request message, containing RSC1 and V or one or more of the encrypted identifiers received from Device UE0 in message M in step 2 (as-is or after decrypting/re-encrypting) to the cellular communication system CCS. Message N may also include the Message Authentication Code received from device UE0. Additionally, UE1 may verify the presence of its nonce (e.g. if it was sent to UE0 in step 1) in order to avoid replay attacks. Alternatively or additionally, the relay UE may limit the number of messages N towards the CCS resulting from incoming messages M (e.g. based on a policy provisioned by the PCF that may set such limit, possibly per RSC)

Step 4: After receiving the message N containing RSC1 and V or one or more of the encrypted identifiers, CCS, in particular the NRF, (e.g. using core network function such as the Policy and Control Function (PCF) and/or Direct Discovery Name Management Function (DDNMF)) determines an RSC2 to be used next time instead of RSC1. Such new Relay Service Code RSC2 can be seen as a kind of alias of the original RSC1, that can be used instead of the original value RSC1, but that are e.g. still associated with the same PDU session parameters and authorization policies. Preferably, Relay Service Code RSC2 is selected from a set of spare Relay Service Codes that are already stored on relay device UE1. The advantage of doing that is that only UE0 needs to be updated, and not relay device UE1 nor any of the other relay device or remote UE devices. These can be updated later using regular PCF or DDNMF provisioning procedures once these devices are in coverage and connected to the network, e.g. once in a while or after all spare Relay Service Codes have been used to update the remote UEs using the procedures as defined here. Preferably the spare Relay Service Codes are not yet assigned to a set of PDU session parameters or are assigned to default, generic or fake PDU session parameters.

The CCS (e.g. using core network functions such as AMF together with the Authentication Server Function (AUSF), Unified Data Management (UDM) function, ProSe Key Management Function (PKMF)) may decrypt V or the encrypted identifiers and securely determine that the message N received from relay device UE1 in step 3 is related to UE0 and relay device UE1. To this end, the CCS may verify the integrity or authenticity of the secure envelope V and/or may correlate the contents of message N and/or correlate the decrypted identifiers with other identity information the CCS has stored about device UE0 and relay device UE1. In other words, it may verify that the protected/securely signed indicator (originating from UE0 via message M) or a different representation thereof (e.g. if the relay device UE1 is allowed to re-encrypt parts of the original indicator from UE0 or is allowed to decrypt the encrypted identifier for UE1 and replace it with another secure representation of the identity of device UE1) indeed proves that the respective relay device UE1 was selected by the remote UE (i.e. device UE0).

This step may also be combined with a step to verify the authorization of the remote UE and relay UE by the network for setting up a relay connection for the particular relay service code and/or for setting up the PDU session with the PDU session parameters associated with the relay service code, and/or may be combined with the procedure to request the security keys for setting up such relay connection from the network. To this end, the messages exchanged and/or the contents of the messages N and N' may be combined with messages used for the authorization/relay security setup procedure (e.g. message N may be NAS Relay Authorization Request/Key Request message or similar message and/or the respective messages may be extended with fields to carry the encrypted relay service code or one or more of the encrypted identifiers received from Device UE0, and message N' may be a NAS Relay Authorization Response/Key Response message or similar message and/or the respective messages may be extended with fields to carry a decrypted relay service code or one or more decrypted identifiers, and the (encrypted) new Relay Service Code RSC2). For determining the value of RSC2 (e.g. selected from a set of spare relay service codes or a fresh (i.e. not previously used or currently unassigned) relay service code), the CCS may manage a set of tables in which it keeps track which Relay Service Codes have been used by which Remote UE and/or for which PDU session information has been exposed to one or more Relay UEs, and/or which Relay Service codes are available (e.g. as spare relay service codes) in one or more Relay UEs or Remote UEs. The CCS may prevent replay attacks by not accepting the same message N twice (within a certain time frame).

Step 5: The CCS sends a response message N' (e.g. Service Request response, RRC connection reconfiguration, UE configuration update, Relay Request Response/Relay Accepted or other RRC or NAS message) to relay device UE1, message N' containing RSC2 that is encrypted with a key that is known or for which a decryption key can be derived by UE0, but not by relay device UE1. Examples of such a decryption key may include a key based on UE0's USIM credentials (for example, encrypted by the latest Remote UE's Kausf—see [TS 33.501]), or a signed public key of the Remote UE (that may be send as part of the Direct Communication Request to the Relay UE which then forwards it to the core network), or a decryption key derived from key material provided during initial provisioning of the remote UE (e.g. together with other information in step 0).

Step 6: Relay device UE1 sends a response message M' (e.g. a Direct Communication Response message or Direct Discovery Response message over PC5 or by forwarding message N') to UE0, containing the encrypted RSC2 received as part of message N' by relay device UE1 in step 5.

Step 7: UE0 decrypts RSC2 and updates the table containing the set of Relay Service Codes and their associated PDU session parameters as received in step 0, or stores the information about RSC1 being replaced by RSC2 in its memory or non-volatile storage. If not started already, UE0 may initiate its indirect communication session with CCS via relay device UE1 making use of PDU session attributes associated to RSC1.

Step 8: During subsequent discovery and connection setup messages over PC5, UE0 uses RSC2 (after decryption) instead of RSC1 in order to find or set up a relay connection which is expected to make use of PDU session attributes that were associated to RSC1, but which are also associated or now newly associated (i.e. after step 6) with the same PDU session attributes.

In a further element of an embodiment, relay device UE1 is only provisioned by the CCS to store a set of Relay Service Codes with no information about PDU session parameters, or whereby each Relay Service Code is associated with a set of unique temporary identifiers for denoting privacy sensitive PDU session parameters (such as temporary slice identifiers known by the CCS to link to the same S-NSSAI, or temporary DNN identifiers).

The benefit of doing so is that the remote UE can next time search for one of the spare service codes and the relay UE would not be able to link the spare service code to the same slice/DNN or the same remote UE (assuming the layer-2 ID has changed in the meantime). Note that it is assumed that RSC2 is encrypted using a key that can only be decrypted by device UE0 (e.g. derived from USIM credentials of device UE0). The identifier of UE0 may e.g. be a Global Unique Temporary Identifier (GUTI) or Temporary Mobile Subscriber Identity (TMSI) or Subscription Concealed Identifier (SUCI). The identifier of UE1 may be a layer-2 identifier used in a PC5 discovery message or other PC5 message received from relay device UE1 or another identifier (such as GUTI/TMSI/SUCI) received as part of a PC5 discovery message or other PC5 message received from relay device UE1. Only if a remote UE which was not updated comes along and searches for the old RSC, then a relay UE which was previously selected may still know the slice information. This can be mitigated by limiting the lifetime of RSCs and/or by reusing RSCs for other PDU session parameters (so that a relay UE cannot know for sure which PDU session parameters correspond to a particular RSC) and/or by updating all remote UEs or potential remote UEs in vicinity of the relay UE (e.g. within a certain tracking area) to use RSC2 instead of RSC1 (e.g. by performing a policy update or UE configuration update). Note that relay device UE1 may automatically already expose or respond to RSC2 during PC5 discovery if it is part of a set of spare Relay Service Codes or may need to be triggered by CCS to do so by sending a separate message containing one or more Relay Service Codes including RSC2 to the relay device UE1 at a randomized time preferably after the UE0 has disconnected (to make sure the relay device UE1 cannot correlate RSC1 and RSC2.

Re-using relay service codes is possible (e.g. by linking PDU session parameters inside CCS to a specific remote UE and relay UE combination), but this may require an elaborate administration. If, after some time, all the spare relay service codes have been used or there is a policy to refresh all relay service codes once in a while, then all (potential) remote UEs and (potential) relay UEs will need to be given a fresh set of relay service codes. Typically, then, the UEs would have to be in coverage of the core network's base stations to be able to connect directly and securely to the core network and not via a potentially insecure connection via a relay UE. Should some (potential) remote UEs be out of coverage for a long period of time, these UE's may not have been updated by the time they want to discover and connect to a relay UE, so these remote UEs may still use the old set of relay service codes. This could lead to potential errors and also security and privacy risks. If such an outdated remote UE connects to a relay device it should preferably send a relay service code which is encrypted using (U)SIM credentials (such as the latest Kausf of that remote UE), along with a freshness parameter that indicates that the keys have not been updated in a while (e.g. by using a key freshness parameter, or a time value when it last received an updated set of relay service codes). Then if this parameter shows that the remote UE's relay service codes and keys have not been updated in a while, then the relay UE and/or CCS should reject this relay service code to be used and refuse to set up the relay connection and not provide the PDU session parameters to the relay UE. In such situation, the relay UE may send the encrypted relay service code and the freshness parameter to the CCS, after which the CCS may assign a fresh RSC2 to the remote UE (and relay UE) and send it as encrypted payload back to the relay UE, which in turn can send it to the remote UE, which may use this fresh RSC2 to connect to the network (e.g. using a default set of PDU session parameters with e.g. the default slice).

It should be understood that it is possible to use both encrypted identifiers and selection of an RSC from the set of spare RSC's together.

In a further element of an embodiment, the cellular communication system CCS only sends a message N' containing an encrypted Relay Service Code RSC2 or PDU session information related to RSC1 to relay device UE1 if the output of decrypting the received secure envelope V or the received encrypted identifiers reveals an identifier of relay device UE1 or the Message Authentication Code as forwarded by the relay device and originating from UE0 reveals that the identifiers have not been manipulated, or if relay device UE1 can be uniquely identified using the information received in message N.

The benefit of doing so is that relay UEs that are not selected by the remote UE cannot receive a new RSC2 nor receive PDU session information related to RSC1 by replaying a message from the selected relay UE or by sending their own message to CCS containing RSC1. Note that it is assumed that secured envelope V or the encrypted identifiers or Message Authentication Code are encrypted/cyphered/encoded/hashed using a key derived from USIM credentials. Note that the CCS can also use the information provided by the encrypted envelope V or the encrypted identifiers or message payload with respective Message Authentication Code to perform an additional verification whether relay device UE1 is allowed/authorized to act as relay UE for the respective remote UE and may send some encrypted verification code as part the same message to Device UE0 containing the encrypted Relay Service Code RSC2.

In a further element of an embodiment, RSC1 is added to secured envelope/payload V or is sent as an encrypted value (e.g. using a public key received during relay discovery) as part of message M. The encrypted RSC1 may subsequently be included by the relay device in message N, and CCS may only send a message containing an encrypted Relay Service Code RSC2 or PDU session information related to RSC1 to relay device UE1 if both RSC1 (e.g. using the original encryption, or decrypted or re-encrypted) and a unique identifier of UE1 are included in message N, or if RSC1 is included and relay device UE1 can be uniquely identified using the information received in message N.

In an example, the payload of message M may include the SUCI or 5G-GUTI of the Remote UE (i.e. ID_Remote), and/or an encrypted Relay Service Code (RSC) and/or SUCI or 5G-GUTI of the relay device (i.e. ID_Relay) selected by remote UE device (UE0). Additionally, or independently, the payload of message M may include a nonce N_Relay received from the relay device (UE1), a fresh nonce N_Remote generated by the remote UE device, and/or a Message Authentication Code. The Relay Service Code and the identity of the selected relay UE may be encrypted (together) to prevent an eavesdropper to link these identities to the remote UE device. Preferably the encryption is performed by using a key/credentials that disallow the information to be decrypted by relay devices (or at least the relay devices that are not selected), whilst the CCS would be able to decrypt the information, in order to ensure that only the relay device that is selected by the Remote UE will receive the PDU session parameters from the network, will get authorized and/or will get the resulting keys for setting up the relay connection. The key (K_enc) used for encryption may be derived from the USIM, such as the latest Kausf or Kseaf that the Remote UE has established with CCS, or the long term security material for relay connection or PC5 link setup as received in step 0 (e.g. PRUK as defined in TS 33.303 or the long term credentials as defined in TS 33.536, or other pre-shared key or public key to secure the communication between the CCS and Remote UE), whereby the nonces N_Relay and/or N_Remote may be used as additional input to the key derivation function. If, as an example, the RSC and ID_Relay are encrypted together, the Message Authentication Code may be calculated using an integrity key K_int as follows: MAC (K_int, ID_Remote|N_Relay|N_ Remote|ENCRYPT(K_enc, RSC|ID_Relay)). After receiving message M, relay device UE1 sends message N to the CCS that may include ID_Remote, the (encrypted) Relay Service Code and/or the (encrypted) ID_Relay (e.g. SUCI/5G-GUTI) of the selected relay device, or the encrypted combined value of the RSC and ID_Relay (e.g. ENCRYPT (RSC ID_Relay)). It should be understood that even though the SUCI is already encrypted identifier itself, it may be encrypted again, using another key, with the benefit that this may securely link the identifier to the RSC.

The message N may include the nonces and the Message Authentication Code in the NAS Relay Authorization Request/Key Request. Upon receiving message N, the CCS (e.g. the AMF together with the AUSF/UDM/PKMF) may derive K_enc and K_int based on ID_Remote and the received nonces, and may check the integrity of message fields and decrypt the encrypted RSC and/or the encrypted value ENCRYPT(RSC|ID_Relay) to obtain the RSC and ID_Relay. The CCS also may verify if the ID_Relay matches the identity of the UE-to-Network Relay from which the message was received, before continuing with subsequent procedures. The CCS and/or the relay device may keep track of the used nonces and discard any message if the nonce is reused to prevent replay attacks. Similarly, the CCS may keep track of the 5G-GUTI or SUCI that has been used to verify if the same value is not used multiple times. The CCS may also keep track of the number of requests coming from a certain remote UE or relay device or remote to verify if it has not exceeded a maximum number of requests within a certain time window. The CCS may send its own nonce to the remote UE or the relay device and wait for a confirmation message from the device using it.

As mentioned above, preferably the requested Relay Service Code can only be decrypted by the CCS. In case the relay device UE1 is preconfigured with the PDU session attributes associated with the supported Relay Service Codes beforehand during initial provisioning, the decrypted Relay Service Code needs to be provided to the relay device after it has been decrypted by the CCS and preferably only after it has been verified that the relay device and remote UE are authorized to set up a relay connection for the respective relay service code via the selected relay device. This can be done by adding the decrypted Relay Service Code to response message N', so that the relay device can use the decrypted Relay Service Code to fetch the PDU session attributes related to the Relay Service Code and set up a PDU session to the core network according to those PDU session attributes.

In the above embodiment ID_Remote is sent without any additional encryption (i.e. the SUCI by itself is already encrypted by the Home Network public key), and may (after being forwarded by the relay device) be used by the CCS to identity the corresponding decryption key or select the correct AUSF, PCF, UDM, PKMF or other network service responsible for the Remote UE's authentication, provisioning/configuration, subscription, prose key management and other network services in the home or visiting network. For example, the CCS (e.g. acting as the relay device's AMF) may after selecting the correct AUSF/PCF/UDM/PKMF to provide the decryption key (e.g. derived from Kausf) for decrypting the encrypted value ENCRYPT(RSC|ID_Relay), or may ask the respective network service to decrypt the encrypted value ENCRYPT(RSC|ID_Relay). The CCS may also use the ID_Remote to select the correct PCF or other network service responsible for allocating new Relay Service Codes. For further protection of the Remote UE's identity, ID_Remote is not sent in the clear, but also sent as part of the encrypted value (i.e. by concatenating RSC, ID_Remote and ID_Relay before encrypting it—preferably by using a key/credentials that disallow the information to be decrypted by relay devices, whilst the CCS would be able to decrypt the information), whereby the ID_Remote is provided to the relay device (in response message N') after being decrypted by the CCS and preferably only after it has been verified that the relay device and remote UE are authorized to set up a relay connection for the respective relay service code via the selected relay device.

The benefit of doing so is that other Remote UEs in vicinity which may use the same RSC and which may have been provisioned with the PDU session parameters associated with that RSC, cannot track other Remote UEs and intrude their privacy by monitoring unprotected PC5 discovery and connection setup related traffic, since the RSC is not sent in the clear anymore, and it also would not know about RSC2 that will be used after the Remote UE has disconnected from the relay UE. Also, by combining the relay service code in a secure fashion (e.g. through a protected payload/envelope or message authentication code that can only be decrypted by the core network) a malicious relay UE cannot easily replace the relay service code with another relay service code. Furthermore, a relay UE that has not been selected cannot easily request the CCS to get involved in relaying with the remote UE for the respective relay service code.

In a further element of the invention that may be combined with any other embodiment or implemented independently, device UE0 is provisioned with a set of spare/equivalent RSCs associated with a same set of PDU session parameters, and device UE0 selects one of these spare/equivalent RSCs in a discovery or connection setup message over PC5 to a relay UE (e.g. on a random basis or by regularly rotating through these spare/equivalent RSCs).

This makes it more difficult for other UEs to understand the correlation between RSC values and PDU session parameters and increases the lifetime before which the RSC values and their mapping to PDU session parameters needs to be renewed.

In a further element of an embodiment that may be combined with any other embodiment or implemented independently, device UE0 and/or relay device UE1 are provisioned in step 0 with the necessary policies, rules and information (e.g. range of values, wildcards, randomization seed, a function to generate them, e.g. a hash function such as SHA-2 or SHA-3, an extensible output function such as SHAKE, or a DRBG as defined in NIST.SP.800-90, etc.) to be able to generates pseudo-randomly the RSC that is currently valid based on time (assuming the Remote UE can know current time through an internal clock or external reference clock (e.g. GPS or provided using a synchronization frame from a base station or relay device) by using a Pseudo-random function (PRF). In order to deal with small time differences that may lead to different Relay Service Codes (RSCs), a message exchange (such as the following challenge-response authentication handshake where the seed RSC is the key) between remote UE and relay UE can take place assuming that both of them have a seed to generate the RSC:

a) remote UE announces its presence by generating a nonce N_UE at random and broadcasting it
b) relay UE receives N_UE, generates nonce relay NR and derives pseudo-random RSCs for all its supported seed_RSC_i (where i is an index) as PRF_RSC_i=Truncate(HASH(seed_RSC_i|N_U-E|N_R), b bits) where Hasho is a hash function, | indicates concatenation, Truncate(X,b) returns b bits of X, e.g. the b least significant bits.
c) relay UE sends back its N_R and all computed PRF_RSC_i
d) remote UE performs similar operation given the received N_R, and checks whether one of the PRF_RSC_i is the same. If there is a match, it selects that relay.

After connecting to a relay UE (that may run a corresponding pseudo-random RSC generator for one or more groups of remote UEs and/or use a wildcard for matching RSCs for one or more groups of remote UEs) with the RSC that is valid at that particular time, the CCS may in step 4 instead or in addition determining RSC2, generate a new range of values, wildcards, randomization seed for the pseudo-random RSC generator, and send this information as part of message N' by encrypting this information with a key that is known or for which a decryption key can be derived by UE0, but not by relay device UE1 (e.g. based on UE0's USIM credentials).

The benefit of doing so is that many more relay service codes will be used over time, and that it becomes very hard for an eavesdropper (including remote UEs that run other pseudo-random key generator or with other range or seed) to link the relay service code to a particular remote UE and to a particular set of PDU session parameters. In this way it may prevent overlap of relay service codes between remote UEs, without hampering scalability.

In a further element of an embodiment that may be combined with any other embodiment or implemented independently, device UE0 includes a Global Unique Temporary Identifier (GUTI) or Temporary Mobile Subscriber Identity (TMSI) or Subscription Concealed Identifier (SUCI) as part of the message M to the relay UE and subsequent message N to CCS in order for the CCS to uniquely identify the Remote UE, and in its response to receiving message N, CCS sends a new encrypted GUTI or TMSI or SUCI via the relay device UE1 to device UE0.

The reason for doing so, is that a GUTI or TMSI or SUCI may need to be sent along with the discovery and/or communication request in the clear over PC5, in order for the CCS to be able to identify the key with which to decrypt secured envelope V and/or the encrypted identifiers. If done in this manner, this means that the GUTI/TMSI/SUCI has been exposed and should not be used again, and hence needs to be updated. The CCS can also verify if the GUTI/TMSI/SUCI sent along with the message corresponds to the identifier of UE0 being sent inside the secured envelope V or as encrypted identifier.

In a further element of an embodiment the CCS sends an updated layer-2 ID or other updated identifiers (e.g. an update to the temporary identifier as received in step 0) of device UE0 and/or relay device UE1 to be used in subsequent messages between UE0 and UE1 as part of its response message N'. Alternatively, device UE0 and/or relay device UE1 may assign themselves a new layer-2 ID upon receiving response message N' or after sending response message M' or after UE0 and UE1 have disconnected from each other, or the CCS may also trigger the device UE0 and/or relay device UE1 to update its layer-2 IDs by sending a separate message.

The reason for doing so, is that since the layer-2 ID or other (temporary) identifiers used between UE0 and UE1 may be sent unencrypted in a message exchange and may hence expose privacy sensitive information. Therefore, the layer-2 IDs or other (temporary) identifiers that are sent unencrypted between UE0 and UE1 should be updated to provide additional protection against malicious tracking of the devices. We note that a UE usually uses GUTI/SUCI where SUCI is the encrypted version of SUPI and it is used to conceal the long-term identity of the UE. After authentication with SUCI, a UE is assigned a GUTI for later connections. In this document, a temporal identifier is introduced as alternative. This is because a relay can gather many GUTIs or SUCIs. A relay can also prevent the UE from getting the responses from the CN. This might have consequences for the remote UE, if the remote sends its GUTI and it does not receive the expected answer. This might force the UE to use the next time the SUCI instead that is more costly. In general, the relay might cause a synchronization error in the mapping GUTI-SUPI that increases latency. This might be a reason for introducing a third temporary identifier as suggested above. Such a third temporary identifier can be of independent interest and it could be used together with other solutions. For instance, in the context of solutions #1, #6, #10 and #15 in TR 33.847 when a remote is sending a request to the CN for establishing a secure PC5 link with the relay. We note that this third temporary ID might be derived in a similar way as the GUTI and be used only in relay settings or it might also be derived from the current GUTI.

In a further element of an embodiment that may be combined with any other embodiment or implemented independently, in order to further protect against malicious relay UEs, device UE0 temporarily stop acting as remote UE and temporarily block/stop/interrupt any ongoing relaying procedure if it does not get a new RSC value (i.e. RSC2) after sending RSC1 to relay device UE1 after a certain time-out period. Device UE0 may wait until it gets into coverage of a gNB, and after attaching to a gNB request an RSC update before activating the remote UE function and start acting as remote UE again.

The reason for doing so, is that response N' sent by CCS to the relay UE may never be forwarded to the remote UE, so remote UE would not know that it should use a new RSC, and may still continue using the old one.

In a further element of an embodiment, in order to further prevent another relay device to send a request message with the same contents as message N to CCS, relay device UE1 may send a second encrypted identity or signature, enabling the CCS to verify if the encrypted identifier of UE1 as received in message N corresponds to the second encrypted identity or signature and/or whether these encrypted identifiers (after decrypting) directly or indirectly identify the same or relate to the same relay device, i.e. in this case relay device UE1. This may also be done by linking the encrypted identifier of relay device UE1 with the identifier used by the relay device to set up the secure link between the relay device and the CCS over which message N is sent.

Note that in case the mobile device uses the PC5 layer-2 identifier (e.g. as used during discovery) as identifier for relay device UE1 as input for message M, the following procedures may apply and augment the detailed procedure described above:
a. If the PC5 layer-2 identifiers used by relay device UE1 are securely configured/provisioned by the CCS (e.g.

using a secure connection between the PCF and the relay device UE1 and/or device UE0), then if 1. the relay device UE1 has an authenticated secure connection to CCS, the CCS can fetch the information that it configured/provisioned for relay device UE1 and verify that the PC5 layer-2 identifier that was configured/provisioned for relay device UE1 corresponds or refers to the same PC5 layer-2 identifier for relay device UE1 that was sent in an encrypted manner as part of message N (originating from message M as sent by device UE0).
2. the relay device UE1 does not have an authenticated secure connection to CCS, the relay device UE1 may add its GUTI/TMSI/IMSI/SUPI/SUCI/GPSI or any other of its unique identifiers or a hash thereof, in an encrypted manner (or as part of a signature) to message N (in addition to envelope V or the encrypted identifiers received by relay device UE1 in message M from device UE0), which allows the CCS to correlate this information with the PC5 layer-2 identifier that it has configured/provisioned for relay device UE1 and verify if it corresponds or refers to the same PC5 layer-2 identifier that was sent in an encrypted manner as part of message N (originating from message M as sent by device UE0).

b. If the PC5 layer-2 identifiers are self-assigned, the relay device UE1 may send, the self-assigned PC5 layer-2 identifier (e.g. after each time it assigns a new layer-2 identifier) in a secure manner to the CCS. The CCS can store this information and link it to other identifiers it has stored for relay device UE1. The CCS can use this information to verify if the self-assigned PC5 layer-2 identifier for relay device UE1 corresponds or refers to the same PC5 layer-2 identifier received in an encrypted manner as part of message N (originating from message M as sent by device UE0).

Note that in case the CSS configures/provisions the PC5 layer-2 identifiers, the CSS may configure/provision the remote UE (i.e. Device UE0) with a set of PC5 layer-2 identifiers that a particular relay UE may use, or with a mapping between a PC5 layer-2 identifier for a relay UE and a set of other identities (e.g. a GUTI/TMSI/SUCI) of the relay UE.

In a further element of an embodiment that may be combined with any other embodiment or implemented independently, the Relay device UE1 upon (initial) registration to the CCS (e.g. when entering a new registration area) or upon setting up a PDU session with the CCS (e.g. for relay purposes) receives an updated list of Relay Service Codes from the CCS with only the Relay Service Codes associated with an allowed network slice/S-NSSAI valid in that registration area for the Remote UE and/or Relay device (e.g. as determined by the AMF, PCF, DDNMF, NG-RAN) to (temporarily) replace or to update the list of Relay Service Codes (and their associated PDU session parameters) that was already provisioned in the Relay device or to be stored as a separate list, or receives a list of Relay Service Codes from the CCS that are associated with a network slice/S-NSSAI that is not allowed in that registration area, in order to update the list of Relay Service Codes (and their associated PDU session parameters) that was already provisioned in the Relay device or to be stored as a separate list, or receives a discovery filter that it should apply during discovery that only matches Relay Service Codes that are associated with an allowed network slice/S-NSSAI. Similarly, in case of Non-Public Network access, if the Relay device UE1 registers to a base station exclusive for that Non-public network (e.g. identified as a Closed Access Group (CAG) cell), it receives an updated list of Relay Service Codes from the CCS with only the Relay Service Codes associated with a Non-Public Network identity/Closed Access Group that is valid/allowed/authorized for the Remote UE and/or Relay device to access (e.g. as determined by the AMF, PCF, DDNMF, NG-RAN) to (temporarily) replace or to update the list of Relay Service Codes (and their associated PDU session parameters) that was already provisioned in the Relay device or to be stored as a separate list, or receives a list of Relay Service Codes from the CCS that are associated with a Non-Public Network identity/Closed Access Group that is not valid/allowed/authorized for the Remote UE and/or Relay device to access, in order to update the list of Relay Service Codes (and their associated PDU session parameters) that was already provisioned in the Relay device or to be stored as a separate list, or receives a discovery filter that it should apply during discovery that only matches Relay Service Codes that are associated with a Non-Public Network identity/Closed Access Group that is valid/allowed/authorized for the Remote UE and/or Relay device to access.

Solution 18 in TR 33.847 describes a protocol for authorization and PC5 link setup for UE-to-Network relay. Its main steps are as follows: in Step 0, the CN, in particular, PKMF and DDNMF, provision remote UE and relay UE with parameters including discovery parameters, PKMF address, or discovery parameters.

In Step 1, the remote UE performs the remote user key request and retrieves PRUK and PRUK ID from the PKMF.

In Step 2, the discovery procedure is performed, e.g. based on TS 33.303 or as in Solutions 3 and 4 in TR 33.847.

In Step 3, the remote UE sends a Direct Communication Request including parameters such as the PRUK ID, the Relay Service Code, a first freshness parameter, etc to the relay UE.

In Step 4, the relay UE sends a key request to the core network retrieving the K_NRP to secure the PC5 interface with the remote UE as well as a second freshness parameter. K_NRP is derived from PRUK and the freshness parameters.

In Step 5, the relay forwards the freshness parameter to the remote UE. With these freshness parameters and the PRUK, the remote UE can generate the same K_NRP as received by the relay UE. K_NRP serves as basis for mutual authentication and security of the PC5 link.

An issue in this solution 18 in TR 33.847 is that in step 3, the Relay Service Code and the PRUK ID are exchanged in the clear, and this represents a privacy issue as identified in above embodiments. This is the reason why S3-212859 proposes to enhance Solution 18 by scrambling these fields in step 3. As a further element of the embodiment that may be combined with any other embodiment or implemented independently, or that may be combined with the procedure in Tdoc S3-212859, pCR of Solution 18 in 3GPP TR 33.847.

For additional privacy protection, the Remote UE should use a different key or pseudorandom sequence for encrypting or scrambling of the Relay Service Code (RSC) and/or the identifiers of Remote UE and/or Relay UE for the Direct Communication Request from the key that was used in previous model B discovery solicitation messages to encrypt/scramble the discovery parameters as part of the discovery messages, for example by using a different FC value (as defined in TS 33.220) as input for the key derivation function.

This may help in preventing an eavesdropper to link discovery messages and related Direct Communication Request messages. For example, in S3-212859 a privacy enhancement is proposed in which the RSC sent in the DCR message is protected (scrambling) by means of a Discover User Scrambling Key (DUSK) key in the code-receiving security parameters of the remote UE. However, this does not provide sufficient protection, because it is proposed to use the same DUSK to protect the RSC and Prose Relay User Key (PRUK) ID. If this key is also used for scrambling the discovery message and the UTC counter may remain identical since the exchange of discovery messages and DCR messages is very fast, then the same scrambling pseudorandom sequence will be used. If the same pseudorandom sequence is used to scramble two different sets of information (discovery message and PRUK ID|RSC, then by xoring the two scrambled sequences, we get the xor of the two sets of information, i.e. the XOR of discovery message and PRUK ID|RSC. This is the XOR of two plaintexts and represents a security risk since the individual parts might be guessed.

In order to protect against such security risk, as advantageously mentioned in this embodiment, it should be specified to use a different pseudorandom sequence for scrambling the Relay Service Code and PRUK ID, preferably by using a different FC value for discovery messages than for Direct Communication Request messages when using the same DUSK to avoid this issue. Alternatively, a different key distributed during initial provisioning, or distributed in a message exchange with the CCS (e.g. with the DDNMF), or a key distributed during discovery should be used.

Additionally, in line with earlier embodiments, the procedure in S3-212859 should be extended with a step whereby the CCS (e.g. DDNMF) assigns a new Relay Service Code value to be used instead of the Relay Service Code that was used in step 4a for subsequent discovery messages, whereby this new Relay Service Code value is sent to the Remote UE (e.g. by extending the key response message of step 4b to the relay UE and subsequent Direct Security Mode command message of step 5a with an additional field with a new Relay Service Code, or a different (set) of message (such as a PC3 message between the DDNMF and the Remote UE)), and whereby the Relay Service Code may be protected with a key derived from Prose Relay User Key (PRUK) (e.g. based on the ID) by using a Key Derivation Function whose S string may include the K_NRP freshness parameter 1 and a UTC-based counter.

Additionally, in line with earlier embodiments, the procedure in S3-212859 should be extended by the Relay UE including a nonce during the discovery step 2, whereby the received nonce should be sent by the remote UE in the subsequent Direct Communication Request message (e.g. as an additional field). Upon receiving the Direct Communication Request message the relay UE can then verify the freshness of the nonce and verify that there are no replay attacks. Alternatively or additionally, the Remote UE should use the received nonce instead of the UTC based counter in Step 1 in 6.18.2.2.2 of S3-212859 (i.e. to ensure that the scrambling sequence is different), in order to ensure that the scrambling sequence is different and allows the relay UE to avoid replay attacks if the relay UE has a policy that each sent nonce as a replay to a discovery message can be used a single time when forwarding a DCR message.

Alternatively or additionally, the relay UE may limit the number of messages towards the CCS (e.g. Key Request messages) resulting from incoming Direct Communication Request messages (e.g. based on a policy provisioned by the PCF that may set such limit, possibly per RSC)

Various methods are provided for use in a cellular communication system as described above. A first method comprises steps to perform, in the mobile device, the relay function. A second method comprises steps to perform, in the relay device, the function of the relay processor. A third method comprises steps to perform, in the cellular network, the Network Relay Function.

Many different ways of implementing the methods are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above method, connection sequence, security process and further operations when executed on a computer device. So, the method according to the invention may be executed using software, which comprises instructions for causing a processor system to perform the respective method.

Typically, the mobile device, the relay device and the NRF, each comprise a processor coupled to a memory containing appropriate software code stored at the devices; for example, that software may have been downloaded and/or stored in a corresponding memory, e.g. a volatile memory such as RAM or a non-volatile memory such as Flash (not shown). The devices may for example be equipped with microprocessors and memories (not shown). Alternatively, the devices may, in whole or in part, be implemented in programmable logic, e.g. as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g. using a hardware description language such as Verilog, VHDL etc.

Software may only include those steps taken by a particular sub-entity of the system. The software may be stored in a suitable storage medium, such as a hard disk, a floppy, a memory etc. The software may be sent as a signal along a wire, or wireless, or using a data network, e.g. the Internet. The software may be made available for download and/or for remote usage on a server. A method according to the invention may be executed using a bit stream arranged to configure programmable logic, e.g. a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the verb 'comprise' does not exclude the presence of elements or steps other than those listed and the word 'a' or 'an' preceding an element does not exclude the presence of a plurality of such elements. Expressions such as 'at least one of' when preceding a list of elements represent a selection of all or of any subset of elements from the list. For example, the expression, 'at least one of A, B, and C' should be understood as including only A, only B, only C, both A and B, both A and C, both B and C, or all of A, B, and C. Any reference signs do not limit the scope of the claims. The invention may be implemented by means of both hardware and software. Several 'means' or 'units' may be represented by the same item of hardware or software, and a processor may fulfil the function of one or more units, possibly in cooperation with hardware elements. Further, the invention is not limited to the embodiments, and the invention lies in each and every novel feature or combination of features described above or recited in mutually different dependent claims.

In summary, a cellular communication system supports network slicing and has a Network Relay Function for managing the indirect connections. A mobile device may send a request message to a relay device, the request message including a relay service code (associated with a set of privacy sensitive PDU session parameters). The relay device receives the request message and sends a transfer request message to the cellular communication system indicating a request to transfer data via an indirect connection and including the requested relay service code. The Network Relay Function receives the transfer request message, determines a different relay service code (from a set of spare relay service codes), the relay service code to be used instead of the requested relay service code, and sends a transfer response message to the relay device, the transfer response message including the different relay service code in an encrypted manner that allows it to be decrypted by the mobile device, but not the relay device. The relay device in turn forwards the encrypted different relay service code to the mobile device in a response to the initial request message.

REFERENCES

[22.261] 3GPP TS 22.261 v16.7.0, Service requirements for the 5G system; Stage 1, 2019-03.
[22.866] 3GPP TR 22.866 v0.2.0, enhanced Relays for Energy Efficiency and Extensive Coverage; Stage 1, 2019-02.
[23.287] 3GPP TS 23.287 v1.0.0, Architecture enhancements for 5G System (5GS) to support Vehicle-to-Everything (V2X) services (Release 16), 2019-05.
[23.303] 3GPP TS 23.303 v15.0.0, Proximity-based services (ProSe); Stage 2 (Release 15), 2017-06.
[23.501] 3GPP TS 23.501, System Architecture for the 5G System; Stage 2, v16.0.2, 2019-04.
[23.503] 3GPP 23.503, TS Policy and charging control framework for the 5G System (5GS); Stage 2 (Release 15.6.0 2019-06)
[23.733] 3GPP TR 23.733 v15.1.0, Study on Architecture Enhancements to ProSe UE-to-Network Relay (Release 15), 2017-12.
[24.334] 3GPP TS 24.334 v15.1.0, Proximity-services (ProSe) User Equipment (UE) to ProSe function protocol aspects; Stage 3, 2017-12.
[24.501] 3GPP TS 24.501, Non-Access-Stratum (NAS) protocol for 5G System (5GS); Stage 3 (Release 15.4.0 2019-06)
[29.507] 3GPP TS 29.507, 5G System; Access and Mobility Policy Control Service; Stage 3, (Release 15.4.0 2019-06)
[33.813] 3GPP TR 33.813 v0.5.0, Study on Security Aspects of Enhanced Network Slicing, 2019-06.
[36.300] 3GPP TS 36.300 v15.2.0, Evolved Universal Terrestrial Radio Access (E-UTRA) and Evolved Universal Terrestrial Radio Access Network (E-UTRAN); Overall description; Stage 2 (Release 15), 2018-06.
[36.746] 3GPP TR 36.764 v15.1.0, Study on further enhancements to LTE Device to Device (D2D), User Equipment (UE) to network relays for Internet of Things (IoT) and wearables; (Release 15), 2017-12.
[38.300] 3GPP TS 38.300 v15.5.0, NR; NR and NG-RAN Overall Description; Stage 2, 2019-03.
[38.331] 3GPP TS 38.331 v15.5.1, NR; Radio Resource Control (RRC) protocol specification, 2019-04.
[38.473] 3GPP TS 38.473, v15.4.1, NG-RAN; F1 application protocol (F1AP), 2019-01.
[38.874] 3GPP TR 38.874 v16.0.0, NR; Study on Integrated Access and Backhaul, 2018-12.
[S2-1907204] 3GPP TS 23.501 CR1522 Introduction of the IAB support in 5GS, 2019-06.
[Elayoubi] Elayoubi et al., 5G RAN Slicing for Verticals: Enablers and Challenges, IEEE Communications Magazine Vol. 57 Iss. 1, 2019.
[EventHelix] EventHelix website, https://www.eventhelix.com/5G/standalone-access-registration/with links to pdf file overview and detailed messages.
[PavelShulgin] 5G StandAlone Access—Registration Procedure—Part2 (AMF selection procedures, slices), https://www.linkedin.com/pulse/5g-standalone-access-registration-procedure-part2amf-pavel-shulgin/

The invention claimed is:
1. A cellular communication system (CCS) comprising a radio access network (RAN), multiple cellular base stations (BS) and a core network (CN),
   the cellular communication system providing a cellular network that supports indirect connections,
      each indirect connection providing data transfer between a mobile device and the cellular communication system via at least one relay device being a mobile device arranged for communication with the radio access network and capable of supporting the indirect connection,
   the cellular communication system further comprising at least one network relay entity arranged to provide a Network Relay Function (NRF) for managing the indirect connections,
   the mobile device comprising:
      a connection processor arranged for managing connections to the cellular network, the connection processor providing a relay function for managing at least one indirect connection, the relay function being arranged to at least
  send, as part of a setup procedure, a request message (M) to at least one relay device (UEx), the request message including a Relay Service Code (RSC1) and an encrypted identifier of the at least one relay device (UEx), and further containing an encrypted identifier of the mobile device;
  receive a response message (M') from the at least one relay device (UEx), the response message including an encrypted Relay Service Code (RSC2);
  decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1;
the relay device comprising:
  a communication unit arranged for communication in the cellular network, and,
  a relay processor arranged for managing the communication in the cellular network and for managing an indirect connection between the mobile device and the cellular network, the relay processor being arranged:
    to receive the request message (M) from the mobile device;
    after receiving request message (M), to send a transfer request message (N) to the cellular communication system in dependence of the request message (M), the transfer request message (M') including the Relay Service Code RSC1 and at least one of the encrypted identifiers received from the mobile device in request message (M);
    to receive a transfer response message (N') from the cellular communication system, the transfer response message (N') containing an encrypted Relay Service Code (RSC2);
    after receiving the transfer response message (N'), to send a response message (M) to the mobile device in dependence of the transfer response message and containing the encrypted Relay Service Code (RSC2);
the Network Relay Function being arranged:
  to receive at least one transfer request message (N) from the relay device, the transfer request message (N) including a Relay Service Code (RSC1) and at least one of the encrypted identifiers of the mobile device and the encrypted identifier of the relay device;
  to determine a different Relay Service Code (RSC2') to be used instead of the Relay Service Code (RSC1) received in the transfer request message (N); to encrypt the different Relay Service Code (RSC2') using a key that allows it to be decrypted by the mobile device but not the relay device, resulting in an encrypted Relay Service Code (RSC2);
  to send a transfer response message (N') including the encrypted Relay Service Code (RSC2) to the relay device.

2. The cellular communication system of claim 1, wherein the Network Relay Function is arranged to encrypt the identifier of the mobile device and/or the identifier of the relay device using a key that allows them to be decrypted by a Network Relay Function (NRF) in the cellular network and not by the relay device.

3. The cellular communication system (CCS) of claim 1, wherein the relay processor is arranged to store a set of spare Relay Service Codes and wherein the Network Relay Function is arranged to select the different Relay Service Code (RSC2') from the set of spare Relay Service Codes available in the relay device or a fresh Relay Service Code.

4. The cellular communication system of claim 1, wherein the mobile device is arranged to send a freshness parameter in the request message, the freshness parameter indicating that keys used to encrypt elements of the request message have not been updated for more than a predetermined time or indicating a time when the keys were last updated.

5. The cellular communication system of claim 1, wherein the Network Relay Function is arranged to add a decrypted Relay Service Code to the transfer response message (N') and the relay device is arranged to use the decrypted Relay Service Code to fetch a PDU session attribute.

6. The cellular communication system of claim 1, wherein the request message (M) and response message (N) include a Global Unique Temporary Identifier (GUTI) or Temporary Mobile Subscriber Identity (TMSI) or Subscription Concealed Identifier (SUCI).

7. The cellular communication system (CCS) of claim 1, wherein the request message (M) includes a Relay Service Code (RSC1) associated with a set of PDU session attributes.

8. The cellular communication system (CCS) of claim 1, wherein the mobile device is arranged to include in the request message (M), a nonce and wherein the relay device is arranged to keep track of the used nonces and discard any request messages containing a previously used nonce or abort the setup procedure.

9. The cellular communication system (CCS) of claim 1, wherein the mobile device is arranged to include in the request message (M), a nonce and wherein relay device is arranged to forward the nonce in the transfer request message (N) and the relay function is arranged to keep track of the used nonces and discard any transfer request messages containing a previously used nonce or abort the setup procedure.

10. The cellular communication system of claim 1, wherein the mobile device comprises a non-volatile storage unit arranged for storing a set of Relay Service Codes that are supported by the mobile device that may each be associated with a set of PDU session attributes and the mobile device being further arranged to store a set of Relay Service Codes that are supported by the mobile device that may each be associated with a set of PDU session attributes, and the relay device comprises a non-volatile storage unit arranged for storing a set of Relay Service Codes that are supported by the relay device, including the set of spare Relay Service Codes and the relay processor of the relay device being further arranged to store a set of spare Relay Service Codes, and wherein the Network Relay Function being further arranged to determine a different Relay Service Code (RSC2') to be used instead of the Relay Service Code (RSC1) received in the transfer request message (M'), where the different Relay Service Code (RSC2') is selected from the set of spare Relay Service Codes available in the relay device.

11. A mobile device arranged to be used in the cellular communication system as defined in claim 1 comprising:
  a transceiver arranged for wireless communication in the cellular network, and
being arranged to store a set of Relay Service Codes that are supported by the mobile device that may each be associated with a set of PDU session attributes, and a connection processor arranged for managing connections to the cellular network, the connection processor providing a relay function for managing at least one indirect connection, the relay function being arranged to at least:
  send, as part of a setup procedure, a request message (M) to at least one relay device (UEx), the request message including a Relay Service Code (RSC1) associated with a set of PDU session attributes and also includes an encrypted identifier of the at least one relay device (UEx), and further containing an encrypted identifier of the mobile device, the identifiers encrypted using a key that allows it to be decrypted by a Network Relay Function (NRF) in the cellular network;
  receive a response message (M') from the at least one relay device (UEx), the response message including an encrypted Relay Service Code (RSC2), the encrypted Relay Service Code (RSC2) encrypted by a Network Relay Function (NRF) in the cellular network using a key that allows it to be decrypted by the mobile device but not the relay device;
  decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1.

12. The mobile device of claim 11, wherein the mobile device selects a different layer-2 identification for the request message (M) from at least the most recently used layer-2 identifications used in a previous message sent from the mobile device to the relay device.

13. The mobile device of claim 11, wherein the mobile device is arranged to send a freshness parameter in the request message, the freshness parameter indicating that keys used to encrypt elements of the request message have not been updated for more than a predetermined time or indicating a time when the keys were last updated.

14. The mobile device of claim 11, wherein the mobile device is arranged to include a Global Unique Temporary Identifier (GUTI) or Temporary Mobile Subscriber Identity (TMSI) or Subscription Concealed Identifier (SUCI) in request message (M).

15. The mobile device of any of claim 11, wherein the mobile device is arranged to include a nonce in the request message (M).

16. The mobile device of any of claim 11, wherein the mobile device is arranged to send a freshness parameter in the request message (M), the freshness parameter indicating that keys used to encrypt elements of the request message have not been updated for more than a predetermined time or indicating a time when the keys were last updated.

17. A network relay entity providing a Network Relay Function (NRF) for use in the cellular communication system as defined in claim 1, the network relay entity being arranged:
  to receive at least one transfer request message (N) from a relay device, the transfer request message (M') including a Relay Service Code (RSC1) and an encrypted identifier of a mobile device that has sent the Relay Service Code (RSC1) to the relay device;
  to determine a different Relay Service Code (RSC2') to be used instead of the Relay Service Code (RSC1) received in the transfer request message (N);
  to encrypt the different Relay Service Code (RSC2') using a key that allows it to be decrypted by the mobile device but not the relay device, resulting in an encrypted Relay Service Code (RSC2), and
  to send a transfer response message (N') including the encrypted Relay Service Code (RSC2) to the relay device.

18. The network relay entity of claim 17 whereby the different Relay Service Code (RSC2') to be used instead of the Relay Service Code (RSC1) is selected from a set of spare Relay Service Codes available in the relay device.

19. The network relay entity of claim 17, wherein the Network Relay Function is arranged to add a decrypted Relay Service Code to the transfer response message (N') and the relay device is arranged to use the decrypted Relay Service Code to fetch a PDU session attribute.

20. The network relay entity of claim 17, wherein the Network Relay Function is arranged to include a new encrypted Global Unique Temporary Identifier (GUTI) or Temporary Mobile Subscriber Identity (TMSI) or Subscription Concealed Identifier (SUCI) in transfer response message (N').

21. A relay device arranged for communication in the cellular network of claim 1 and comprising:
  a relay processor arranged for managing the communication in the cellular network and for managing an indirect connection between the mobile device and the cellular network,
the relay processor being arranged:
  to receive, as part of a setup procedure, the request message (M) from the mobile device;
  after receiving request message (M), to send a transfer request message (N) to the cellular communication system in dependence of the request message (M), the transfer request message (N) including the Relay Service Code RSC1 and at least one of the encrypted identifiers received from the mobile device in request message (M);
  to receive a transfer response message (N') from the cellular communication system, the transfer response message (N') containing an encrypted Relay Service Code (RSC2);
  after receiving the transfer response message (N'), to send a response message (M') to the mobile device in dependence of the transfer response message and containing the encrypted Relay Service Code (RSC2).

22. The relay device of claim 21, wherein the relay device is arranged to forward, in the transfer request message (N), any nonce or freshness parameter received in the request message (M).

23. The relay device of claim 21, wherein the relay device is arranged to keep track of the used nonces and discard any request messages containing a previously used nonce or abort the setup procedure.

24. A cellular communication system (CCS) comprising a radio access network (RAN), multiple cellular base stations (BS) and a core network (CN),
  the cellular communication system providing a cellular network that supports indirect connections,
    each indirect connection providing data transfer between a mobile device and the cellular communication system via at least one relay device being a mobile device arranged for communication with the radio access network and capable of supporting the indirect connection,
  the cellular communication system comprising at least one network relay entity arranged to provide a Network Relay Function (NRF) for managing the indirect connections, the mobile device comprising:
  a connection processor arranged for managing connections to the cellular network, the connection processor providing a relay function for managing at least one indirect connection,
the relay function being arranged to at least:
  send, as part of a setup procedure, a request message (M) to at least one relay device (UEx), the request message including a Relay Service Code (RSC1) and also includes an identifier of the at least one relay device (Uex), and further containing an identifier of the mobile device and a message authentication code;
  receive a response message (M') from the at least one relay device (Uex), the response message including an encrypted Relay Service Code (RSC2);
  decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1;
the relay device comprising:
  a communication unit arranged for communication in the cellular network, and,
  a relay processor arranged for managing the communication in the cellular network and for managing an indirect connection between the mobile device and the cellular network,
the relay processor being arranged:
  to receive the request message (M) from the mobile device;
  after receiving request message (M), to send a transfer request message (N) to the cellular communication system in dependence of the request message (M), the transfer request message (N) including the Relay Service Code RSC1, the message authentication code and the identifier of the mobile device received from the mobile device in request message (M);
  to receive a transfer response message (N') from the cellular communication system, the transfer response message (N') containing an encrypted Relay Service Code (RSC2);
  after receiving the transfer response message (N'), to send a response message (M') to the mobile device in dependence of the transfer response message and containing the encrypted Relay Service Code (RSC2);
the Network Relay Function being arranged:
  to receive at least one transfer request message (N) from the relay device, the transfer request message (N) including a Relay Service Code (RSC1) and an identifier of the mobile device and the message authentication code;
  to determine a different Relay Service Code (RSC2') to be used instead of the Relay Service Code (RSC1) received in the transfer request message (N);
  to encrypt the different Relay Service Code (RSC2') using a key that allows it to be decrypted by the mobile device but not the relay device, resulting in an encrypted Relay Service Code (RSC2);
  to send a transfer response message (N') including the encrypted Relay Service Code (RSC2) to the relay device.

25. The cellular communication system of claim 24 wherein at least one of the Relay Service Code (RSC1), the identifier of the mobile device, and the identifier of the at least one relay device (UEx) in the request message (M) and the transfer request message (N) are encrypted by the mobile device or are integrity protected by the message authentication code, in order to represent a protected indicator indicative that the mobile device has selected the at least one relay device (UEx).

26. The cellular communication system of claim 25 wherein the relay device includes in transfer request message (N) the identifier of the at least one relay device received from the mobile device in the request message (M).

27. The cellular communication system of claim 25, wherein the key used by the mobile device to encrypt the at least one of the Relay Service Code, the identifier of the mobile and the identifier of the at least one relay device, or the key used to determine the message authentication code allows decryption by the Network Relay Function (NRF) in the cellular network and not by the relay devices (UEx).

28. The cellular communication system of claim 25, wherein the Network Relay Function (NRF) only sends a transfer response message (N') containing an encrypted Relay Service Code RSC2 or PDU session information related to RSC1 to the at least one relay device (UEx) if the output of decrypting the received encrypted identifiers reveals an identifier of the at least one relay device or if the Message Authentication Code as forwarded by the at least one relay device and originating from the mobile device reveals that the identifiers have not been manipulated, using the information received in the transfer request message (N).

29. The cellular communication system of claim 28, wherein the information provided by the encrypted identifiers or message payload with respective Message Authentication Code in the transfer request message (N) is used by the cellular communication system (CCS) to perform an additional verification whether the at least one relay device (UEx) is allowed/authorized to act as relay UE for the respective remote UE.

30. A mobile device arranged to be used in the cellular communication system as defined in claim 24 comprising:
  a transceiver arranged for wireless communication in the cellular network, and
being arranged to store a set of Relay Service Codes that are supported by the mobile device that may each be associated with a set of PDU session attributes, and
  a connection processor arranged for managing connections to the cellular network, the connection processor providing a relay function for managing at least one indirect connection,
the relay function being arranged to at least:
  send a request message (M) to at least one relay device (UEx), the request message including a Relay Service Code (RSC1) and also includes an identifier of the at least one relay device (UEx), and further containing an identifier of the mobile device, and a message authentication code;
  receive a response message (M') from the at least one relay device (UEx), the response message including an encrypted Relay Service Code (RSC2), the encrypted Relay Service Code (RSC2) encrypted by a Network Relay Function (NRF) in the cellular network using a key that allows it to be decrypted by the mobile device but not the relay device;
  decrypt the encrypted Relay Service Code (RSC2) and insert the decrypted Relay Service Code (RSC2') instead of RSC1 in subsequent discovery and connection setup messages, whereby RSC2' is associated with the same set of PDU session attributes as RSC1.

31. The mobile device of claim 30 whereby a key is used to encrypt at least one of the Relay Service Code, the identifier of the mobile and the identifier of the at least one relay device, or a key is used to determine the message authentication code that allows decryption by the Network Relay Function (NRF) in the cellular network and not by the relay devices (UEx).

32. A network relay entity providing a Network Relay Function (NRF) for use in the cellular communication system as defined in claim 24, the network relay entity being arranged:
- to receive at least one transfer request message (M') from a relay device, the transfer request message (N) including a Relay Service Code (RSC1) and an identifier of a mobile device that has sent the Relay Service Code (RSC1) to the relay device and a message authentication code;
- check the message authentication code to verify that the Relay Service Code and the identifier of the mobile device have not been manipulated
- to determine a different Relay Service Code (RSC2') to be used instead of the Relay Service Code (RSC1) received in the transfer request message (N), whereby the different Relay Service Code (RSC2') is selected from a set of spare Relay Service Codes available in the relay device or a fresh Relay Service Code;
- to encrypt the different Relay Service Code (RSC2') using a key that allows it to be decrypted by the mobile device but not the relay device, resulting in an encrypted Relay Service Code (RSC2);
- to send a transfer response message (N') including the encrypted Relay Service Code (RSC2) to the relay device.

33. A relay device arranged for communication in the cellular network of claim 24 and comprising:
a relay processor arranged for managing the communication in the cellular network and for managing an indirect connection between the mobile device and the cellular network, The relay processor being arranged:
- to store a set of spare Relay Service Codes;
- to receive, as part of a setup procedure, the request message (M) from the mobile device;
- after receiving request message (M), to send a transfer request message (N) to the cellular communication system in dependence of the request message (M), the transfer request message (N) including the Relay Service Code RSC1, the message authentication code and the identifier of the mobile device received from the mobile device in request message (M);
- to receive a transfer response message (N') from the cellular communication system, the transfer response message (N') containing an encrypted Relay Service Code (RSC2);
- after receiving the transfer response message (N'), to send a response message (M') to the mobile device in dependence of the transfer response message and containing the encrypted Relay Service Code (RSC2).

* * * * *